(12) United States Patent
Nishiyama et al.

(10) Patent No.: US 11,506,437 B2
(45) Date of Patent: Nov. 22, 2022

(54) REFRIGERATING CYCLE DEVICE HAVING WIRING SWITCH PART THAT SWITCHES BETWEEN WIRING STATES

(71) Applicant: Mitsubishi Electric Corporation, Tokyo (JP)

(72) Inventors: Takumi Nishiyama, Tokyo (JP); Koichi Arisawa, Tokyo (JP); Masahiro Nigo, Tokyo (JP); Kazunori Hatakeyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 16 days.

(21) Appl. No.: 17/045,551

(22) PCT Filed: Apr. 25, 2018

(86) PCT No.: PCT/JP2018/016702
§ 371 (c)(1),
(2) Date: Oct. 6, 2020

(87) PCT Pub. No.: WO2019/207661
PCT Pub. Date: Oct. 31, 2019

(65) Prior Publication Data
US 2021/0164715 A1 Jun. 3, 2021

(51) Int. Cl.
*F25B 49/02* (2006.01)
*F25B 30/02* (2006.01)
*F25B 31/02* (2006.01)

(52) U.S. Cl.
CPC ............ *F25B 49/025* (2013.01); *F25B 30/02* (2013.01); *F25B 31/026* (2013.01);
(Continued)

(58) Field of Classification Search
CPC .............. F25B 49/025; F25B 2600/024; F25B 2700/17; F25B 2700/21152
See application file for complete search history.

(56) References Cited

U.S. PATENT DOCUMENTS

2001/0045101 A1* 11/2001 Graham ............... B60H 1/3208
62/236
2015/0135754 A1* 5/2015 Nakai ................... F25B 49/022
62/228.4
(Continued)

FOREIGN PATENT DOCUMENTS

JP S58-057669 U 4/1983
JP 2006-246674 A 9/2006
(Continued)

OTHER PUBLICATIONS

Office Action dated Jan. 5, 2021 issued in corresponding JP patent application No. 2020-515353 (and English machine translation).
(Continued)

*Primary Examiner* — Jonathan Bradford
(74) *Attorney, Agent, or Firm* — Posz Law Group, PLC

(57) ABSTRACT

A refrigerating cycle device includes a compressor, a motor, and a wiring switch part. The compressor compresses a refrigerant. The motor generates power for compressing the refrigerant by rotating a rotor with voltage applied to a plurality of wirings. The motor is disposed in the compressor. The wiring switch part switches between a plurality of wiring states by changing connection between the plurality of wirings. When a rotational speed of the rotor exceeds a predetermined value, the wiring switch part switches to a first wiring state of the plurality of wiring states. The first wiring state differs from a second wiring state of the plurality of wiring state. Efficiency of the second wiring state is highest at the rotational speed.

17 Claims, 28 Drawing Sheets

(52) U.S. Cl.
CPC ..... *F25B 2600/024* (2013.01); *F25B 2700/17* (2013.01); *F25B 2700/21152* (2013.01)

(56) References Cited

U.S. PATENT DOCUMENTS

2015/0168033 A1   6/2015   Yamakawa et al.
2015/0263660 A1*  9/2015   Patrick .................. H02P 25/188
                                                254/362

FOREIGN PATENT DOCUMENTS

| JP | 2009-216324 A | 9/2009 |
| JP | 2012-251713 A | 12/2012 |
| WO | 2014/002251 A1 | 1/2014 |

OTHER PUBLICATIONS

International Search Report of the International Searching Authority dated Jul. 10, 2018 for the corresponding international application No. PCT/JP2018/016702 (and English translation).

* cited by examiner

U PHASE

V PHASE

W PHASE

U PHASE

V PHASE

W PHASE

REFRIGERATING CYCLE DEVICE HAVING WIRING SWITCH PART THAT SWITCHES BETWEEN WIRING STATES

CROSS REFERENCE TO RELATED APPLICATION

This application is a U.S. national stage application of International Patent Application No. PCT/JP2018/016702 filed on Apr. 25, 2018, the disclosure of which is incorporated herein by reference.

TECHNICAL FIELD

The present invention relates to a refrigerating cycle device.

BACKGROUND

Conventionally, there has been a technique of changing the wiring states of a motor used in an air conditioner. For example, Patent Literature 1 discloses an air conditioner, which has a wiring state that is a star connection during a normal heating operation, switches the wiring state to a delta connection when the indoor temperature decreases or during a defrosting operation.

PATENT REFERENCE

Patent Literature

Patent Literature 1: Japanese Utility Model Application Publication No. S58-57669

However, there is a problem in that the temperature in the compressor does not readily raise because the efficiency of the motor is improved when the wiring state is switched to a delta connection during high-speed rotation of the motor, as in the conventional art.

SUMMARY

Therefore, a purpose of at least one aspect of the present invention is to raise the temperature in the compressor so as to heat a refrigerant efficiently by switching the wiring state to a wiring state having lower efficiency when the rotational speed of the motor is higher than a predetermined rotational speed.

A refrigerating cycle device according to a first aspect of the present invention includes a compressor, a motor, and a wiring switch part. The compressor compresses a refrigerant. The motor generates power for compressing the refrigerant by rotating a rotor with voltage applied to a plurality of wirings. The motor is disposed in the compressor. The wiring switch part switches between a plurality of wiring states by changing connection between the plurality of wirings. When a rotational speed of the rotor exceeds a predetermined value, the wiring switch part switches to a first wiring state of the plurality of wiring states, the first wiring state differing from a second wiring state of the plurality of wiring state. Efficiency of the second wiring state is highest at the rotational speed.

According to at least one aspect of the present invention, the temperature in a compressor can be raised and a refrigerant can be efficiently heated, by switching the wiring state to a wiring state having lower efficiency when the rotational speed of a motor is higher than a predetermined rotational speed.

DETAILED DESCRIPTION

MODE FOR CARRYING OUT THE INVENTION

First Embodiment

Figure 1:
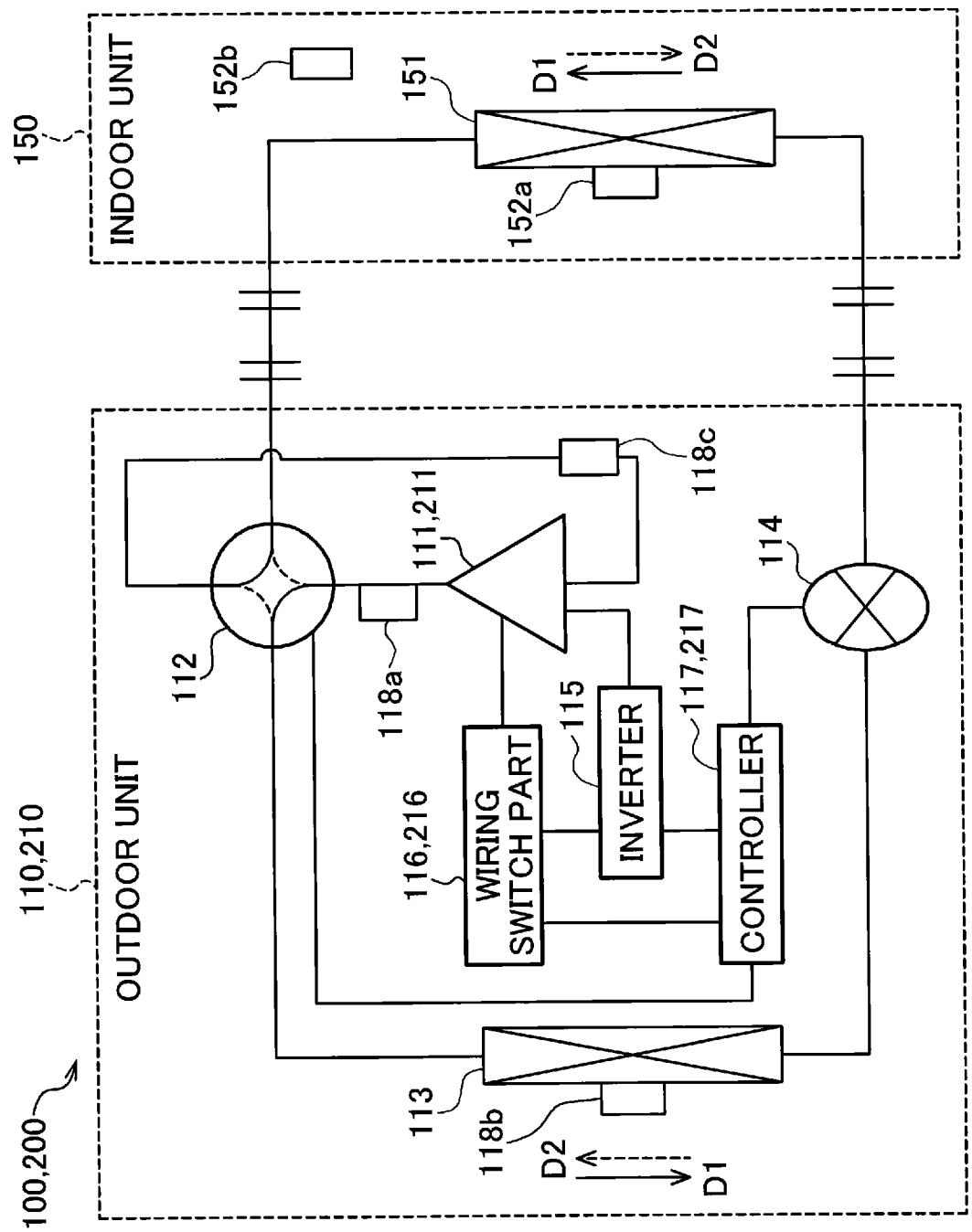
FIG. 1 is a refrigerant circuit diagram schematically illustrating the configuration of an air conditioner according to first and second embodiments.

FIG. 1 is a refrigerant circuit diagram schematically illustrating the configuration of an air conditioner 100 functioning as a refrigerating cycle device according to the first embodiment.

As illustrated, the air conditioner 100 includes an outdoor unit 110 and an indoor unit 150.

The outdoor unit 110 includes a compressor 111, a four-way valve 112, an outdoor heat exchanger 113, an expansion valve 114, an inverter 115, a wiring switch part 116, a controller 117, a discharge temperature detector 118a, an outdoor-heat-exchange intermediate-temperature detector 118b, and an intake temperature detector 118c.

The indoor unit 150 includes an indoor heat exchanger 151, an indoor-heat-exchange intermediate-temperature detector 152a, and an intake temperature detector 152b.

The air conditioner 100 can be switched between a heating operation and a cooling operation by a switching operation of the four-way valve 112.

During the cooling operation, the refrigerant flows in a direction D1 indicated by the solid arrows. Specifically, the refrigerant pressurized and sent out by the compressor 111 flows through the four-way valve 112, the outdoor heat exchanger 113, the expansion valve 114, the indoor heat exchanger 151, and the four-way valve 112, and returns to the compressor 111. During the cooling operation, the outdoor heat exchanger 113 acts as a condenser and discharges heat, and the indoor heat exchanger 151 acts as an evaporator and absorbs heat to cool a room.

During the heating operation, the refrigerant flows in a direction D2 indicated by the dashed arrows. Specifically, the refrigerant pressurized and sent out by the compressor 111 flows through the four-way valve 112, the indoor heat exchanger 151, the expansion valve 114, the outdoor heat exchanger 113, and the four-way valve 112, and returns to the compressor 111. During the heating operation, the indoor heat exchanger 151 acts as a condenser and discharges heat to heat the room, and the outdoor heat exchanger 113 acts as an evaporator and absorbs heat.

The compressor 111 pressurizes and compresses the refrigerant.

The expansion valve 114 depressurizes and expands the refrigerant.

The inverter 115 applies voltage to the motor driving the compressor 111.

The wiring switch part 116 changes the connections between a plurality of wirings in the motor driving the compressor 111 so as to switch between a plurality of wiring states. In the first embodiment, the wiring switch part 116 switches the wiring state of the motor between a star connection, which is a wiring state having a large electromotive force, and a delta connection, which is a wiring state having a small electromotive force.

The controller 117 controls the four-way valve 112, the expansion valve 114, and the wiring switch part 116. In the first embodiment, the controller 117 controls these components in each of the following operation modes: a cooling operation mode, a heating operation mode, and a defrosting operation mode. In particular, when the motor is to be operated at a high rotational speed, such as in the defrosting operation mode or at the start of the heating operation, the controller 117 uses the star connection, which is a connection state having a large electromotive force, to deliberately impair efficiency.

Note that the term "efficiency" refers to combined efficiency determined by multiplying motor efficiency by inverter efficiency. Since the motor efficiency and the combined efficiency transition in the same way, the term "efficiency" may also refer to the motor efficiency.

Specifically, when the rotational speed of the rotor of the motor exceeds a predetermined value, the controller 117 causes the wiring switch part 116 to switch to a wiring state differing from a wiring state having the highest efficiency at that rotational speed. For example, the air conditioner 100 performs the defrosting operation at a rotational speed higher than the rotational speed corresponding to the highest efficiency in a wiring state having the smallest electromotive force of the plurality of wiring states. In such a case, the wiring switch part 116 switches to a wiring state (first wiring state) other than the wiring state having the smallest electromotive force (second wiring state). In this case, the predetermined value represents the rotational speed of the motor 121 during a rated operation.

When the heating operation is started, the air conditioner 100 normally operates at a rotational speed in a rated operation domain. In such a case, the wiring switch part 116 switches to a wiring state (first wiring state) other than a wiring state (second wiring state) having the highest efficiency in the rated operation domain. In this case, the predetermined value represents the rotational speed at which switching between the wiring state having the smallest electromotive force and the wiring state having the second smallest electromotive force, among the plurality of wiring states is to be executed.

The discharge temperature detector 118a detects the temperature of the refrigerant discharged from the compressor 111.

The outdoor-heat-exchange intermediate-temperature detector 118b detects the temperature of the refrigerant during heat exchange at the outdoor heat exchanger 113.

The intake temperature detector 118c detects the temperature of the refrigerant being sucked into the compressor 111.

The indoor-heat-exchange intermediate-temperature detector 152a detects the temperature of the refrigerant during heat exchange at the indoor heat exchanger 151.

The intake temperature detector 152b detects the temperature of the air sucked into the indoor unit 150.

Figure 2:
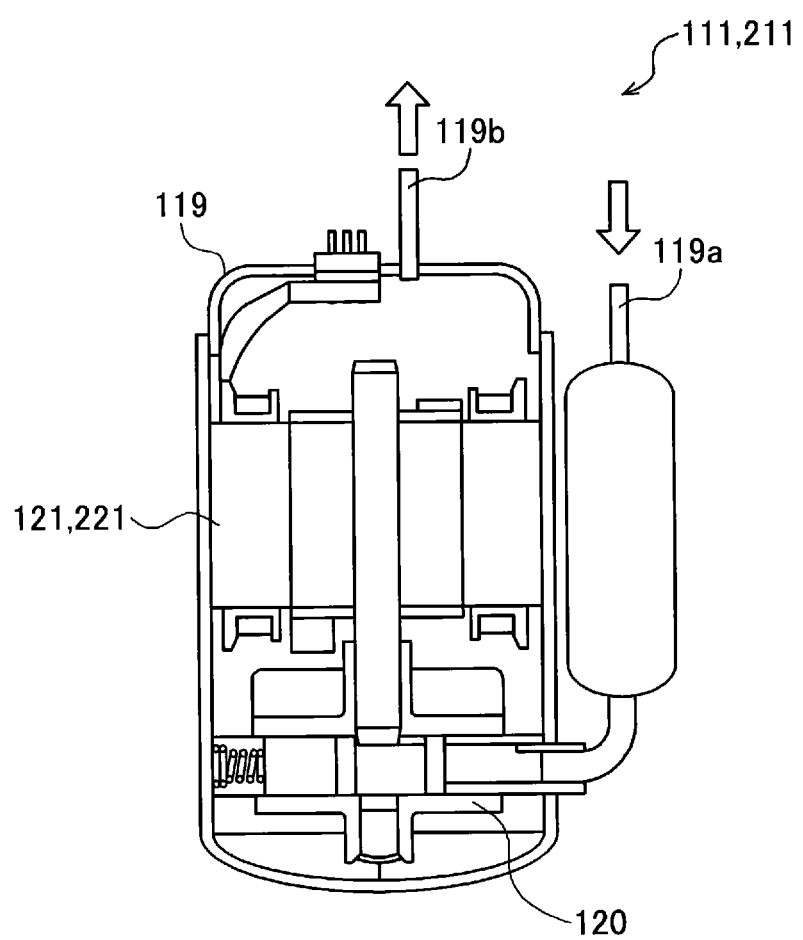
FIG. 2 is a schematic longitudinal cross-sectional diagram of the configuration of a compressor in the first and second embodiments.

FIG. 2 is a longitudinal cross-sectional diagram schematically illustrating the configuration of the compressor 111.

The compressor 111 includes, in an airtight container 119, a compression mechanism 120 compressing the refrigent and a motor 121 applying power to the compression mechanism 120.

The low-temperature, low-pressure refrigerant is sucked into the airtight container 119 from an inlet part 119a and compressed with the compression mechanism 120 so as to enter a high-temperature, high-pressure state. The high-temperature, high-pressure refrigerant is then discharged from an outlet port 119b.

The refrigerant in the airtight container 119 passes through a position close to the motor 121 and is heated by the heat generated by the motor 121.

Figure 3:
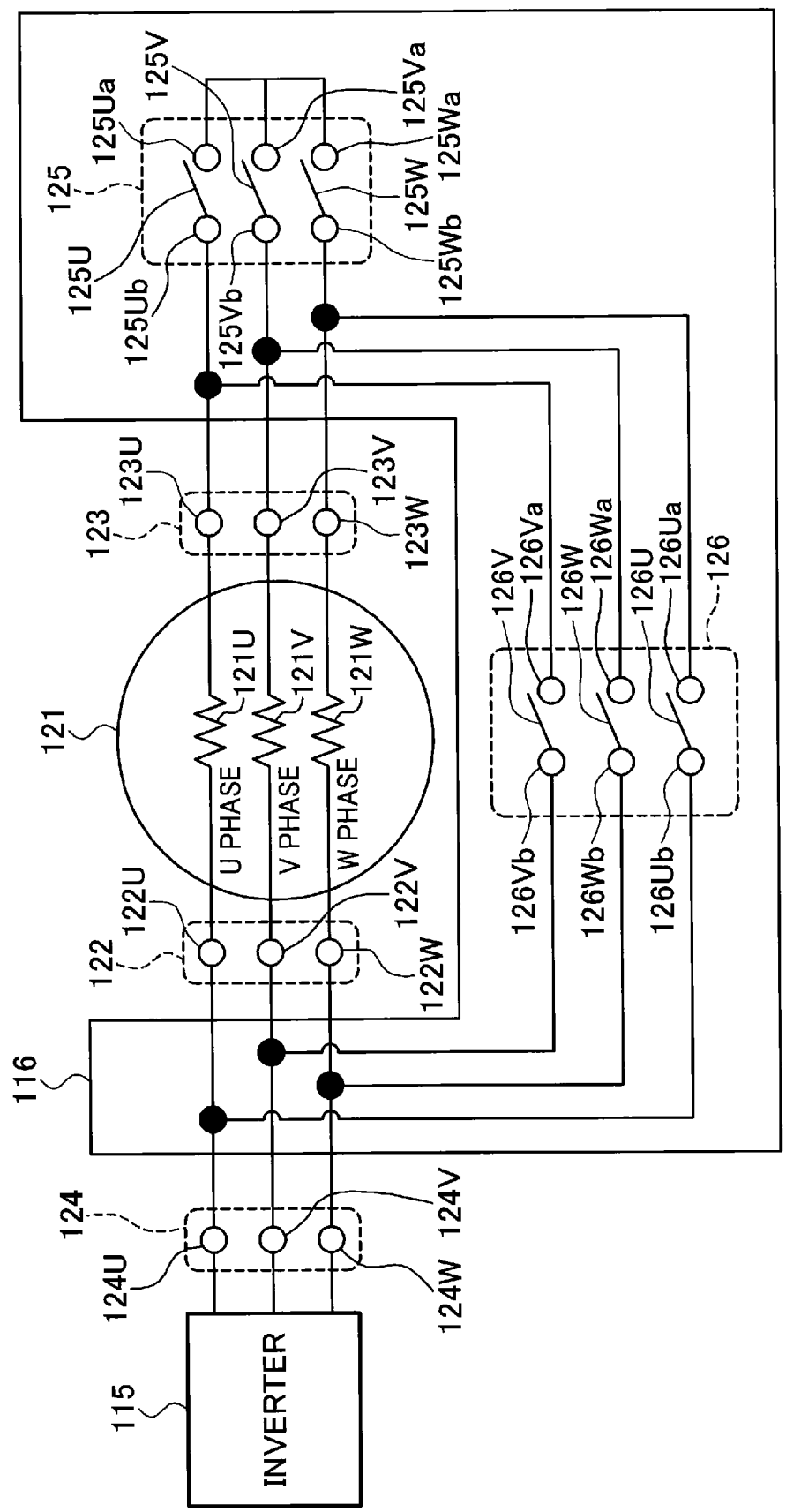
FIG. 3 is a schematic diagram illustrating the connection relation of an inverter, a wiring switch part, and a motor in the first embodiment.

FIG. 3 is a schematic diagram illustrating the connection relation of the inverter 115, the wiring switch part 116, and the motor 121.

Figure 4A:
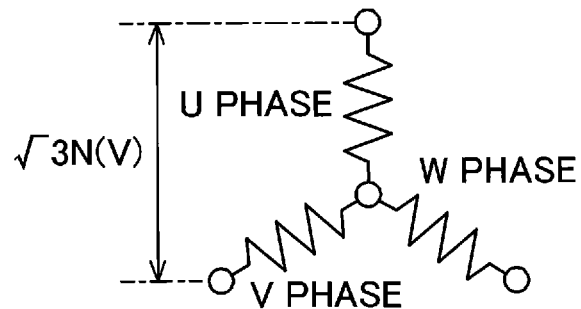
FIGS. 4A and 4B are schematic diagrams illustrating wiring states of the motor in the first embodiment.
Figure 4B:
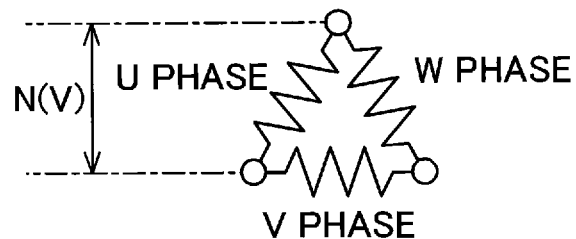

FIGS. 4A and 4B are schematic diagrams illustrating wiring states of the motor 121.

In FIG. 3, the motor 121 is a three-phase permanent magnet type motor. The motor 121 generates power for compressing the refrigerant by rotating a rotor with voltage applied to a plurality of wirings.

The motor 121 includes a U-phase wiring 121U as a wiring for U-phase, a V-phase wiring 121V as a wiring for V-phase, and a W-phase wiring 121W as a wiring for W-phase.

One end of the U-phase wiring 121U is coupled to a first U-phase terminal 122U, and the other end is coupled to a second U-phase terminal 123U.

One end of the V-phase wiring 121V is coupled to a first V-phase terminal 122V, and the other end is coupled to a second V-phase terminal 123V.

One end of the W-phase wiring 121W is coupled to a first W-phase terminal 122W, and the other end is coupled to the second W-phase terminal 123W.

The first U-phase terminal 122U is coupled to a U-phase output terminal 124U of the inverter 115.

The first V-phase terminal 122V is coupled to a V-phase output terminal 124V of the inverter 115.

The first W-phase terminal 122W is coupled to a W-phase output terminal 124W of the inverter 115.

Here, the first U-phase terminal 122U, the first V-phase terminal 122V, and the first W-phase terminal 122W constitute a first terminal 122. The second U-phase terminal 123U, the second V-phase terminal 123V, and the second W-phase terminal 123W constitute a second terminal 123. The U-phase output terminal 124U, the V-phase output terminal 124V, and the W-phase output terminal 124W constitute an output terminal 124.

The wiring switch part 116 is coupled between the first terminal 122 and the output terminal 124, and coupled to the second terminal 123.

The wiring switch part 116 includes a first switch 125 and a second switch 126.

The first switch 125 includes a first U-phase switch 125U, a first V-phase switch 125V, and a first W-phase switch 125W.

The first U-phase switch 125U is a switch that opens and closes the connection between a first U-phase first-end terminal 125Ua and a first U-phase second-end terminal 125Ub.

The first V-phase switch 125V is a switch that opens and closes the connection between a first V-phase first-end terminal 125Va and a first V-phase second-end terminal 125Vb.

The first W-phase switch 125W is a switch that opens and closes the connection between a first W-phase first-end terminal 125Wa and a first W-phase second-end terminal 125Wb.

The first U-phase first-end terminal 125Ua, the first V-phase first-end terminal 125Va, and the first W-phase first-end terminal 125Wa are mutually coupled to each other.

The first U-phase second-end terminal 125Ub is coupled to the second U-phase terminal 123U. The first V-phase second-end terminal 125Vb is coupled to the second V-phase terminal 123V. The first W-phase second-end terminal 125Wb is coupled to the second W-phase terminal 123W.

The second switch 126 includes a second U-phase switch 126U, a second V-phase switch 126V, and a second W-phase switch 126W.

The second U-phase switch 126U is a switch that opens and closes the connection between a second U-phase first-end terminal 126Ua and a second U-phase second-end terminal 126Ub.

The second V-phase switch 126V is a switch that opens and closes the connection between a second V-phase first-end terminal 126Va and a second V-phase second-end terminal 126Vb.

The second W-phase switch 126W is a switch that opens and closes the connection between a second W-phase first-end terminal 126Wa and a second W-phase second-end terminal 126Wb.

The second U-phase first-end terminal 126Ua is coupled between the second W-phase terminal 123W and the first W-phase second-end terminal 125Wb. The second U-phase second-end terminal 126Ub is coupled between the U-phase output terminal 124U and the first U-phase terminal 122U.

The second V-phase first-end terminal 126Va is coupled between the second U-phase terminal 123U and the first U-phase second-end terminal 125Ub. The second V-phase second-end terminal 126Vb is coupled between the V-phase output terminal 124V and the first V-phase terminal 122V.

The second W-phase first-end terminal 126Wa is coupled between the second V-phase terminal 123V and the first V-phase second-end terminal 125Vb. The second W-phase second-end terminal 126Wb is coupled between the W-phase output terminal 124W and the first W-phase terminal 122W.

With the above-described configuration, when the first switch 125 is closed and the second switch 126 is opened, the wiring state of the motor 121 is switched to a star connection, as illustrated in FIG. 4A. On the other hand, when the first switch 125 is opened and the second switch 126 is closed, the wiring state of the motor 121 is switched to a delta connection, as illustrated in FIG. 4B.

The controller 117 illustrated in FIG. 1 sends a signal to the wiring switch part 116 to control the opening and closing of the first switch 125 and the second switch 126, and thereby switches the wiring state to either one of those illustrated in FIGS. 4A and 4B.

The star connection illustrated in FIG. 4A is a wiring state having a large electromotive force. The delta connection illustrated in FIG. 4B is a wiring state having a small electromotive force. Since the line induced voltage of the star connection is √3 times that of the delta connection, high efficiency can be achieved in an intermediate operation domain. Since the wiring state is switched to the delta connection when an operation needs to be performed in the rated operation domain, the induced voltage is reduced so that the peak of efficiency can be achieved to the rated operation domain. As described above, it is possible to maintain high efficiency in both the intermediate operation domain and the rated operation domain.

Note that the rated operation domain is a domain of rotational speed including the rotational speed of the motor 121 during the rated operation. The intermediate operation domain is a domain of rotational speed including the rotational speed of the motor 121 during the intermediate operation.

Figure 5:
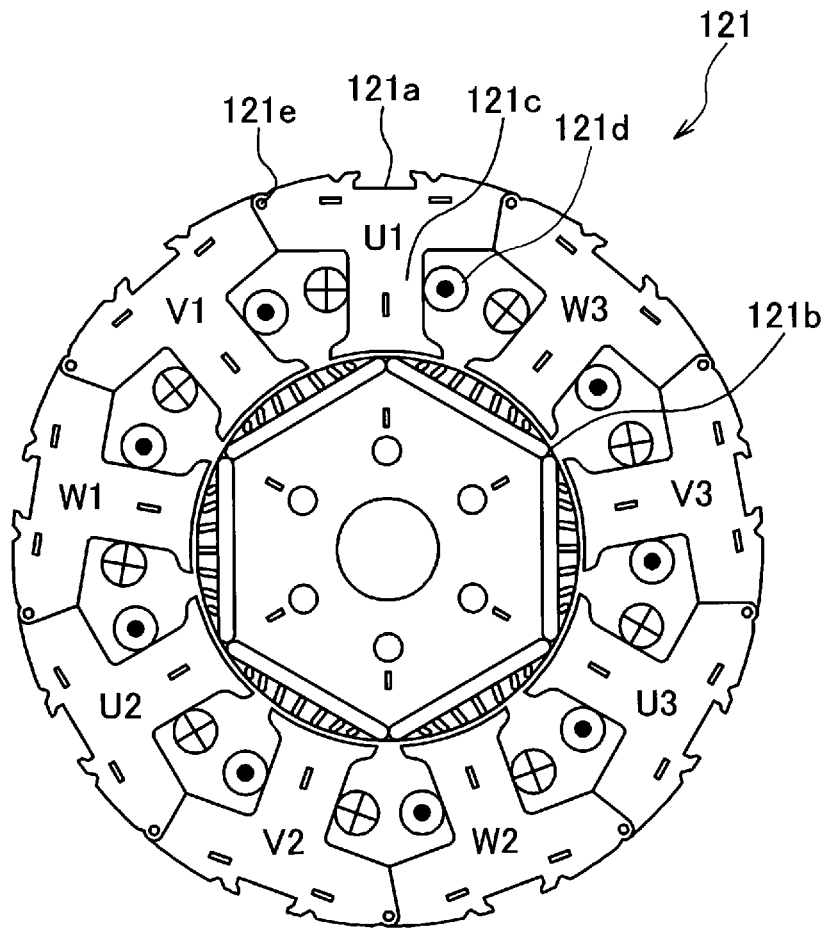
FIG. 5 is a transverse cross-sectional diagram of the internal structure of a motor.

FIG. 5 is a transverse cross-sectional diagram illustrating the internal structure of the motor 121.

In the motor 121A, a rotor 121b is placed inside a stator 121a.

The stator 121a has a concentrated winding structure in which wirings 121d are wound around teeth 121c via an insulating material (not illustrated). Concentrated winding is a method adopted by compressors of air conditioners or the like. Concentrated winding is highly efficient because the length of the coil perimeter can be decreased compared with that of a conventionally typical distributed winding method.

Note that, in FIG. 5, the stator 121a consists of divided cores. The teeth 121c can be opened around the rotary shafts 121e. In this way, the wirings 121d can be wound with a satisfactory space factor while the teeth 121c are in an opened state. Therefore, the motor 121 has even higher efficiency.

The internal connections of the motor 121 will now be described. In FIG. 5, the corresponding teeth 121c are denoted by explanatory tooth numbers "U1, U2, and U3," "V1, V2, and V3," and "W1, W2, and W3." These numbers indicate that a U-phase wiring is wound around each of the teeth 121c denoted by the tooth numbers U1, U2, and U3, a V-phase wiring is wound around each of the teeth 121c denoted by the tooth numbers V1, V2, and V3, and a W-phase wiring is wound around each of the teeth 121c denoted by the tooth numbers W1, W2, and W3.

FIG. 5 illustrates a six-pole motor in which the wirings per phase correspond to three teeth. For example, in the case of a four-pole motor, the number of teeth is six, and the wirings per phase correspond to two teeth. In the case of an eight-pole motor, the number of teeth is 12, and the wirings per phase correspond to four teeth.

FIGS. 6 and 7 are schematic diagrams of connection states of the motor 121 illustrated in FIG. 5.

Figure 6A:
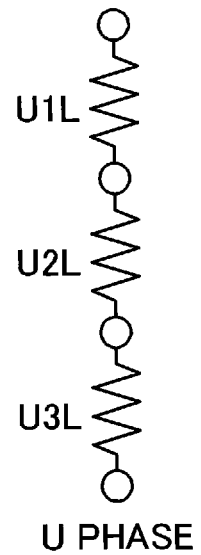
FIGS. 6A to 6C are schematic diagrams of a first example of a connection state of a motor.
Figure 6B:
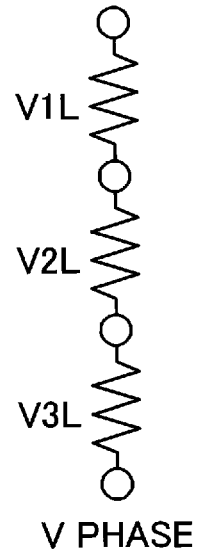
Figure 6C:
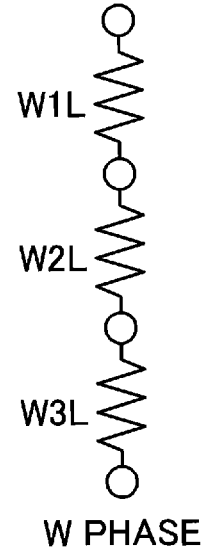
Figure 7A:
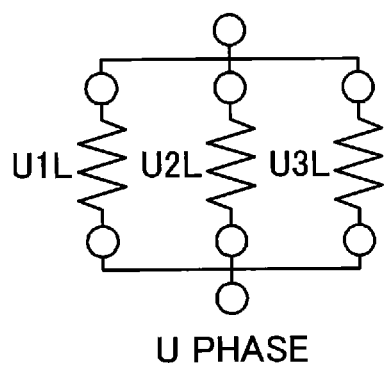
FIGS. 7A to 7C are schematic diagrams of a first example of a connection state of a motor.
Figure 7B:
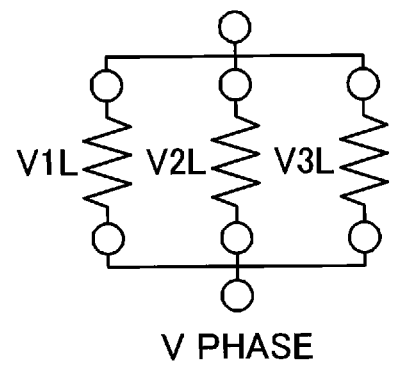
Figure 7C:
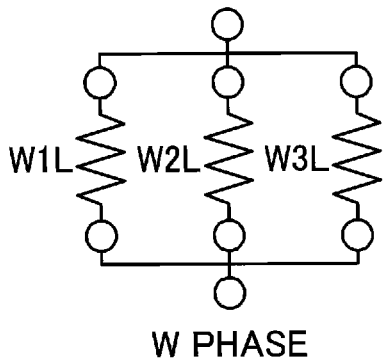

In the motor 121 illustrated in FIG. 5, the wirings are connected in series, as illustrated in FIG. 6A to 6C, or in parallel, as illustrated in FIGS. 7A to 7C.

In FIGS. 6A to 6C and 7A to 7C, the U-phase wiring wound around the tooth 121c corresponding to the tooth number U1 is denoted by a reference character U1L; the U-phase wiring wound around the tooth 121c corresponding to the tooth number U2 is denoted by a reference character U2L; the U-phase wiring wound around the tooth 121c corresponding to the tooth number U3 is denoted by a reference character U3L; the V-phase wiring wound around the tooth 121c corresponding to the tooth number V1 is denoted by a reference character V1L; the V-phase wiring wound around the tooth 121c corresponding to the tooth number V2 is denoted by a reference character V2L; the V-phase wiring wound around the tooth 121c corresponding to the tooth number V3 is denoted by a reference character V3L; the W-phase wiring wound around the tooth 121c corresponding to the tooth number W1 is denoted by a reference character W1L; the W-phase wiring wound around the tooth 121c corresponding to the tooth number W2 is denoted by a reference character W2L; and the W-phase wiring wound around the tooth 121c corresponding to the tooth number W3 is denoted by a reference character W3L.

Note that equivalent designs can be provided for either connection by changing the diameter of the wirings and by winding multiple wirings. In the first embodiment, one of the connections is selected during production.

The controller 117 illustrated in FIG. 1 widens the operational range of the motor 121 by using field weakening control to increase the rotational speed limit or by increasing the output voltage of the inverter 115 to increase the rotational speed limit. In this way, the controller 117 operates the motor 121 so that the efficiency may peak during low-speed rotation and fall below the efficiency of a delta connection during high-speed rotation, such as in the defrosting operation mode.

Various temperature detectors 118a to 118c, 152a, and 152b which are necessary for the refrigerating cycle according to the first embodiment are only illustrated in FIG. 1. However, additional temperature detectors may be provided, for example, for detecting the temperature near the inlets and outlets of the refrigerant subjected to heat exchange or the outside air temperature, in order to perform more precise detection and control.

Note that, although not illustrated in FIG. 1, for example, multiple indoor units 150 may be coupled to a single outdoor unit 110, or one or more indoor units 150 may be coupled to multiple outdoor units 110.

The operation of the air conditioner 100 according to the first embodiment will now be explained.

Figure 8A:
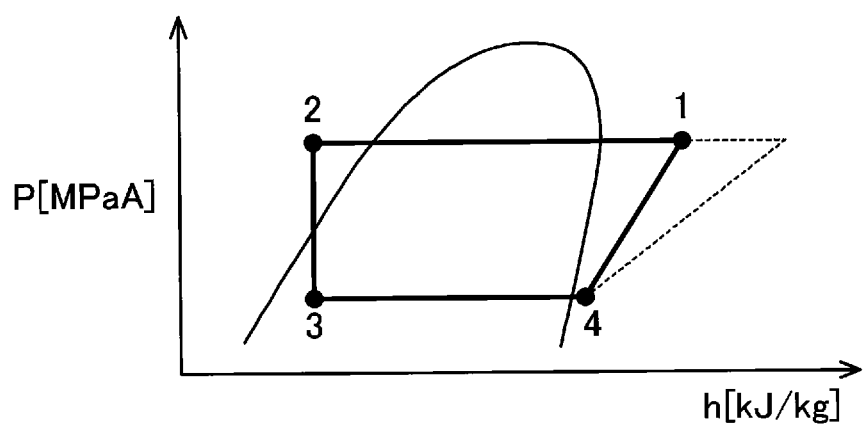
FIGS. 8A and 8B are pressure-specific enthalpy charts of a refrigerating cycle.
Figure 8B:
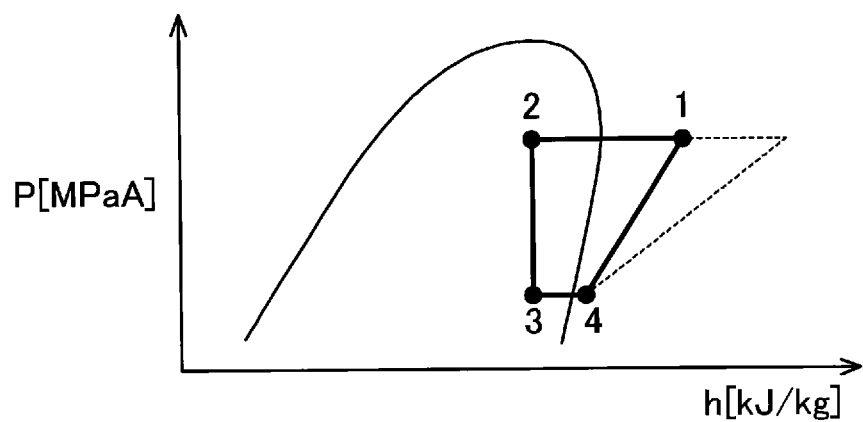

FIG. 8A is a pressure-specific enthalpy chart (p-h chart) of a refrigerating cycle for the cooling and heating operations of the air conditioner 100 according to the first embodiment. FIG. 8B is a p-h chart of a refrigerating cycle for a defrosting operation of the air conditioner 100 according to the first embodiment.

First, the refrigerating cycle for the cooling operation of the air conditioner 100 according to the first embodiment will now be explained with reference to FIG. 8A.

The refrigerant flows from the compressor 111 to the outdoor heat exchanger 113 through the four-way valve 112. At the outdoor heat exchanger 113, the refrigerant is condensed. The condensation of the refrigerant is represented as a change from point 1 to point 2 in FIG. 8A.

The refrigerant condensed at the outdoor heat exchanger 113 is depressurized at the expansion valve 114 into a low-temperature, low-pressure state. The depressurization of the refrigerant is represented as a change from point 2 to point 3 in FIG. 8A.

The refrigerant depressurized at the expansion valve 114 is then sent to the indoor heat exchanger 151. At the indoor heat exchanger 151, the refrigerant vaporizes and extracts the heat of vaporization. The vaporization of the refrigerant is represented as a change from point 3 to point 4 in FIG. 8A.

The refrigerant that has vaporized at the indoor heat exchanger 151 then returns to the compressor 111 through the four-way valve 112. At the compressor 111, the refrigerant is compressed into a high-temperature, high-pressure state. The compression of the refrigerant is represented as a change from point 4 to point 1 in FIG. 8A.

By repeating the above operation, the air conditioner 100 extracts heat from the inside of the room to cool the inside of the room.

The refrigerating cycle for the heating operation of the air conditioner 100 according to the first embodiment will now be explained with reference to FIG. 8A.

The refrigerant flows from the compressor 111 to the indoor heat exchanger 151 through the four-way valve 112. At the indoor heat exchanger 151, the refrigerant is condensed and releases heat into the inside of the room. The condensation of the refrigerant is represented as a change from point 1 to point 2 in FIG. 8A.

The refrigerant condensed at the indoor heat exchanger 151 is depressurized at the expansion valve 114 to facilitate evaporation. The depressurization of the refrigerant is represented as a change from point 2 to point 3 in FIG. 8A.

The refrigerant depressurized at the expansion valve 114 is then sent to the outdoor heat exchanger 113. At the outdoor heat exchanger 113, the refrigerant vaporizes and extracts the heat of vaporization. The vaporization of the refrigerant is represented as a change from point 3 to point 4 in FIG. 8A.

The refrigerant that has vaporized at the outdoor heat exchanger 113 then returns to the compressor 111 through the four-way valve 112. At the compressor 111, the refrigerant is compressed into a high-temperature, high-pressure state.

By repeating the above operations, the air conditioner 100 releases heat into the inside of the room and heats the inside of the room.

During the cooling operation or the heating operation, the controller 117 sends a signal to the expansion valve 114 to control the throttling on the basis of the detected results of the various temperature detectors 118*a* to 118*c*, 152*a*, and 152*b*. For example, in the case of control at suction superheat (SH) during the cooling operation, the controller 117 controls the expansion valve 114 on the basis of the temperature difference between the indoor heat-exchange intermediate temperature detected by the indoor-heat-exchange intermediate-temperature detector 152*a* and the intake temperature detected by the intake temperature detector 118*c*. In the case of control by the discharge temperature detected by the discharge temperature detector 118*a*, the controller 117 controls the expansion valve 114 on the basis of the temperature difference between the discharge temperature detected by the discharge temperature detector 118*a* and a predetermined target discharge temperature.

The controller 117 prioritizes user settings for an indoor fan (not illustrated). The controller 117 drives an outdoor fan (not illustrated) at a predetermined fan rotational speed in accordance with the operation mode set on the basis of the temperature difference between a set temperature and the indoor temperature. Incidentally, in the case where the rotational speed of the indoor fan is changeable within the device, for example, by automatic operation, the controller 117 may drive the indoor fan, in a manner similar to the outdoor fan, at a predetermined fan rotational speed or with the rotational speed of the indoor fan varied in accordance with the temperature difference between the indoor temperature and a set temperature.

The defrosting operation mode will now be explained. In the defrosting operation mode, for example, when the outdoor heat-exchange intermediate temperature detected by the outdoor-heat-exchange intermediate-temperature detector 118*b* falls to or below a predetermined threshold or when the outdoor heat-exchange intermediate temperature detected by the outdoor-heat-exchange intermediate-temperature detector 118*b* remains at or below the predetermined threshold for a predetermined time, the controller 117 switches the four-way valve 112 so that the flow of the refrigerant is the same as that in the cooling mode. When a predetermined time is passed, the controller 117 switches back to the heating mode.

The refrigerating cycle for the defrosting operation of the air conditioner 100 according to the first embodiment will now be explained with reference to FIG. 8B.

The refrigerant flows from the compressor 111 to the outdoor heat exchanger 113 through the four-way valve 112. At the outdoor heat exchanger 113, the refrigerant is condensed. The condensation of the refrigerant is represented as a change from point 1 to point 2 in FIG. 8B.

The refrigerant condensed at the outdoor heat exchanger 113 is depressurized at the expansion valve 114 into a low-temperature, low-pressure state. The depressurization of the refrigerant is represented as a change from point 2 to point 3 in FIG. 8B.

The refrigerant depressurized at the expansion valve 114 is then sent to the indoor heat exchanger 151. At the indoor heat exchanger 151, the refrigerant vaporizes and extracts the heat of vaporization. The vaporization of the refrigerant is represented as a change from point 3 to point 4 in FIG. 8B.

The refrigerant that has vaporized at the indoor heat exchanger 151 then returns to the compressor 111 through the four-way valve 112. At the compressor 111, the refrigerant is compressed into a high-temperature, high-pressure state. The compression of the refrigerant is represented as a change from point 4 to point 1 in FIG. 8B.

By repeating the above operations for a predetermined time, the air conditioner 100 can melt the frost on the outdoor heat exchanger 113.

During the defrosting operation, the controller 117 sends a signal to the expansion valve 114 to control the throttling on the basis of the detected results of the various temperature detectors 118*a* to 118*c*, 152*a*, and 152*b*. The controller 117 stops the indoor fan (not illustrated) so that the user may experience a minimum feeling of hot or cold. The controller 117 also causes the outdoor fan to stop or rotate at a low speed so as to melt the frost by sensible heat and latent heat of the refrigerant. Therefore, the larger the temperature difference between the outdoor intermediate temperature and the temperature of the refrigerant, the shorter the defrosting time can be. Note that the outdoor fan can be operated in response to the intake temperature detected by the intake temperature detector 118*c* so as to perform SH control.

The controller 117 may switch the wiring state of the wiring switch part 116, and adjust the rotational speed of the compressor 111, the rotational speed of the indoor fan or outdoor fan, or the opening rate of the expansion valve 114, on the basis of the temperature difference between the discharge temperature detected by the discharge temperature detector 118*a* and a preset heat resisting temperature of the compressor 111.

Figure 9A:
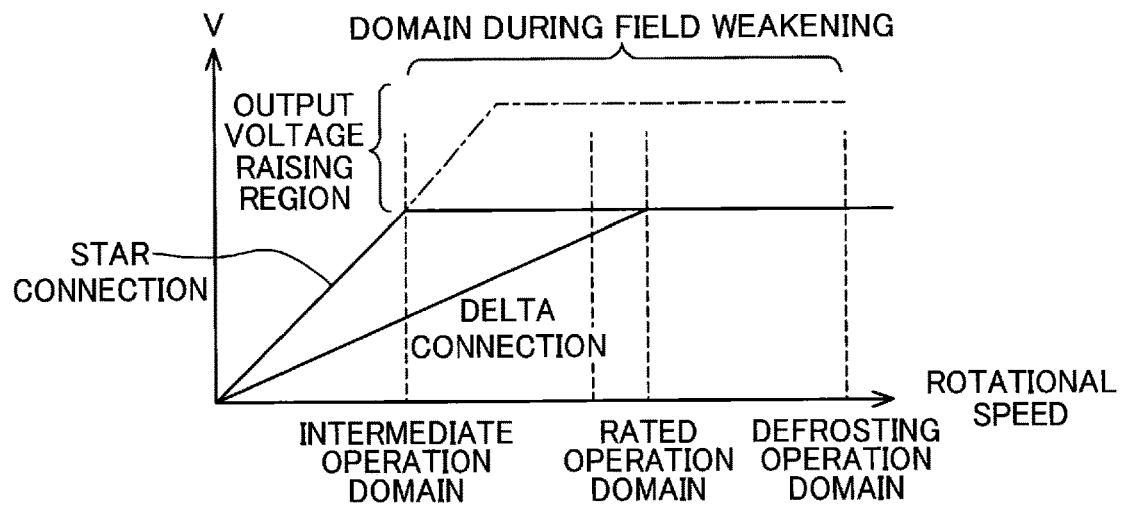
FIGS. 9A and 9B are schematic diagrams illustrating the relation of the rotational speed of a compressor to voltage and combined efficiency in the first embodiment.
Figure 9B:
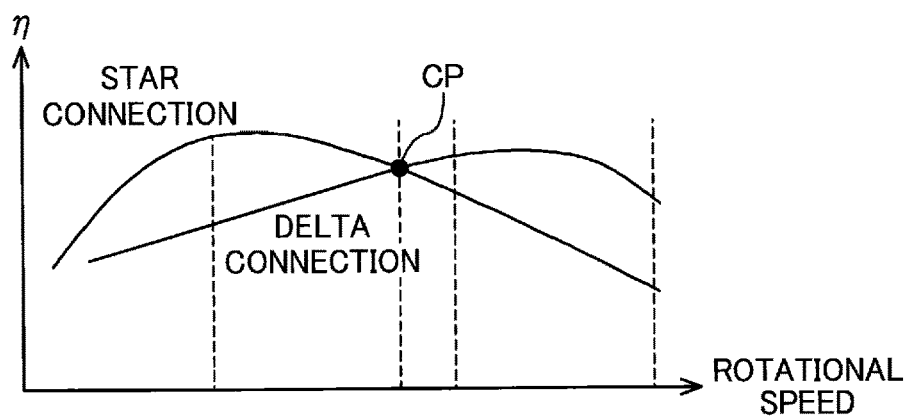

FIGS. 9A and 9B are schematic diagrams illustrating the relation of the rotational speed of the compressor 111 to voltage and combined efficiency. FIG. 9A illustrates the relation between the rotational speed and voltage. FIG. 9B illustrates the relation between the rotational speed and combined efficiency.

As illustrated in FIG. 9A, voltage is substantially proportional to rotational speed, and an operation is possible up to a rotational speed at which the voltage reaches the maximum inverter output voltage. As in FIG. 9A, with the star connection, the voltage reaches the maximum inverter output voltage in the intermediate operation domain, and with the delta connection, the voltage reaches the maximum inverter output voltage in the rated operation domain.

Note that the rotational speed increases in the order of the intermediate operation domain, the rated operation domain, and the defrosting operation domain, as illustrated in FIG. 9A. Incidentally, the operation is performed in the defrosting operation domain at a rotational speed higher than the rotational speed of the motor 121 during the rated operation.

When the operation exceeds a rotational speed at which the voltage reaches the maximum output voltage, field weakening control for suppressing the voltage is performed to increase the output voltage of the inverter and increase the rotational speed limit.

In general, with each connection method, the motor efficiency increases together with an increase in rotational speed, peaks after entering the field weakening domain, and then decreases. The combined efficiency $\eta$ including the inverter efficiency is also represented by substantially the same curve. Note that the combined efficiency $\eta$ is determined by "motor efficiency×inverter efficiency."

As illustrated in FIG. 9B, the combined efficiency $\eta$ peaks in the intermediate operation domain with the star connection and the rated operation domain with the delta connection. In the defrosting operation domain, the combined efficiency $\eta$ is lower with the star connection than the delta connection.

As illustrated in FIG. 9B, the combined efficiency $\eta$ in the intermediate operation domain intersects the combined efficiency $\eta$ in the rated operation domain at a cross-point CP. It is efficiently preferable that the wiring state be switched to the star connection at a timing when the load (temperature difference) corresponds to a rotational speed lower than or equal to that at the cross-point CP, and switched to the delta connection at a timing when the load corresponds to a rotational speed higher than that at the cross-point CP.

At this time, the rotational speed corresponding to the cross-point CP may be experimentally determined in advance, and the wiring state may be controlled on the basis of this rotational speed. Alternatively, the wiring state may be controlled so that the current value, the temperature, or the like becomes optimum for the product in which the compressor 111 is used. The wiring state may be switched at a rotational speed other than the rotational speed at the cross-point CP in accordance with a factor except efficiency, such as a limitation on the current or optimality of the switching control. For reasons such as controllability, hysteresis may be provided at the switching timing of the wiring state.

In a connection state having a large electromotive force, the wiring state is switched to the star connection, and the induced voltage is raised. In such a connection state, the inverter 115 reaches a maximum output voltage at a low rotational speed. In contrast, in a connection state having a small electromotive force, the wiring state is switched to the delta connection, and the induced voltage is lowered. In such a connection state, the inverter 115 reaches a maximum output voltage at a high rotational speed.

The torque generated by the motor 121 is determined by the product of induced voltage and current. Therefore, the connection state having a large electromotive force generates low current. This lowers the inverter loss and thereby causes the inverter efficiency to be high. In contrast, the connection state having a small electromotive force generates large current, and thus the inverter efficiency is impaired.

Figure 10:
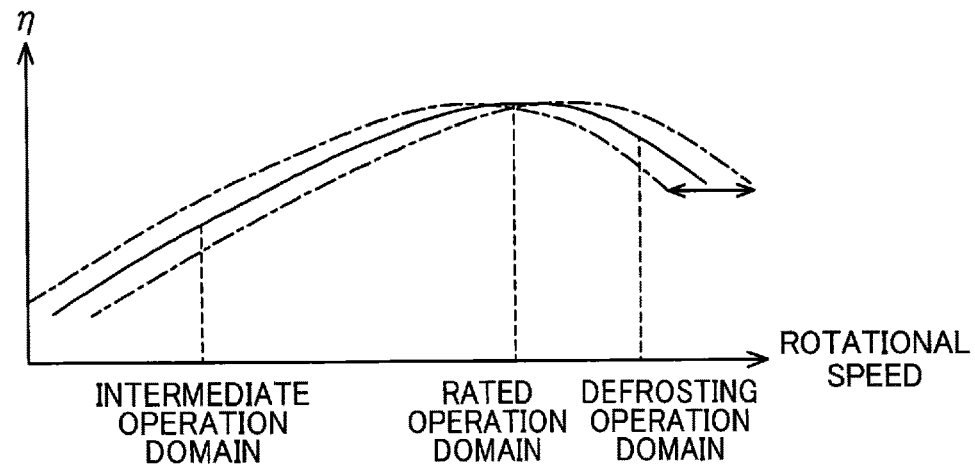
FIG. 10 is a graph illustrating an efficiency characteristic line of the combined efficiency in a connection state having a large electromotive force or a connection state having a small electromotive force, and the efficiency characteristic line of the combined efficiency of when the phase of three-phase AC current is shifted.

FIG. 10 is a graph illustrating an efficiency characteristic line of the combined efficiency $\eta$ in the connection state having a large electromotive force or the connection state having a small electromotive force, and efficiency characteristic lines of the combined efficiency $\eta$ with the phase of the three-phase AC current being shifted.

In FIG. 10, the efficiency characteristic line before the phase shift is indicated by the solid line, and the efficiency characteristic lines after the phase shift are indicated by the dashed line.

As illustrated in FIG. 10, the peak points of the combined efficiency $\eta$ in the intermediate operation domain or the rated operation domain can be shifted by shifting the phase of the three-phase AC current output from the inverter 115. Therefore, the wiring state of the wiring switch part 116 can be switched to significantly shift the peak of the combined efficiency $\eta$ of the motor 121 relative to the rotational speed of the motor 121, and the phase of the three-phase AC current can be shifted to shift the peak of the combined efficiency $\eta$ within a small range.

Figure 11:
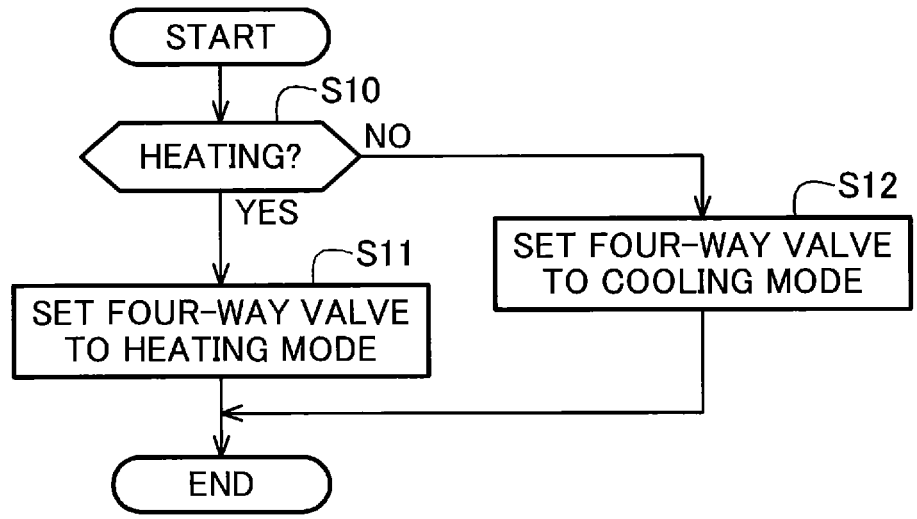
FIG. 11 is a flowchart illustrating an operation of the air conditioner according to the first embodiment for determining an operation mode.

FIG. 11 is a flowchart illustrating the operation for determining the operation mode by the air conditioner 100 according to the first embodiment.

The controller 117 determines whether or not the operation mode of the air conditioner 100 is a heating mode (step S10). For example, the controller 117 may determine whether or not the operation mode is the heating mode on the basis of an instruction input by the user via a remote controller (not illustrated). If the operation mode is the heating mode (Yes in step S10), the process proceeds to step S11. If the operation mode is not the heating mode and is a cooling mode (No in step S10), the process proceeds to step S12.

In step S11, the controller 117 sets the four-way valve 112 to the heating mode.

In step S12, the controller 117 sets the four-way valve 112 to the cooling mode.

Figure 12:
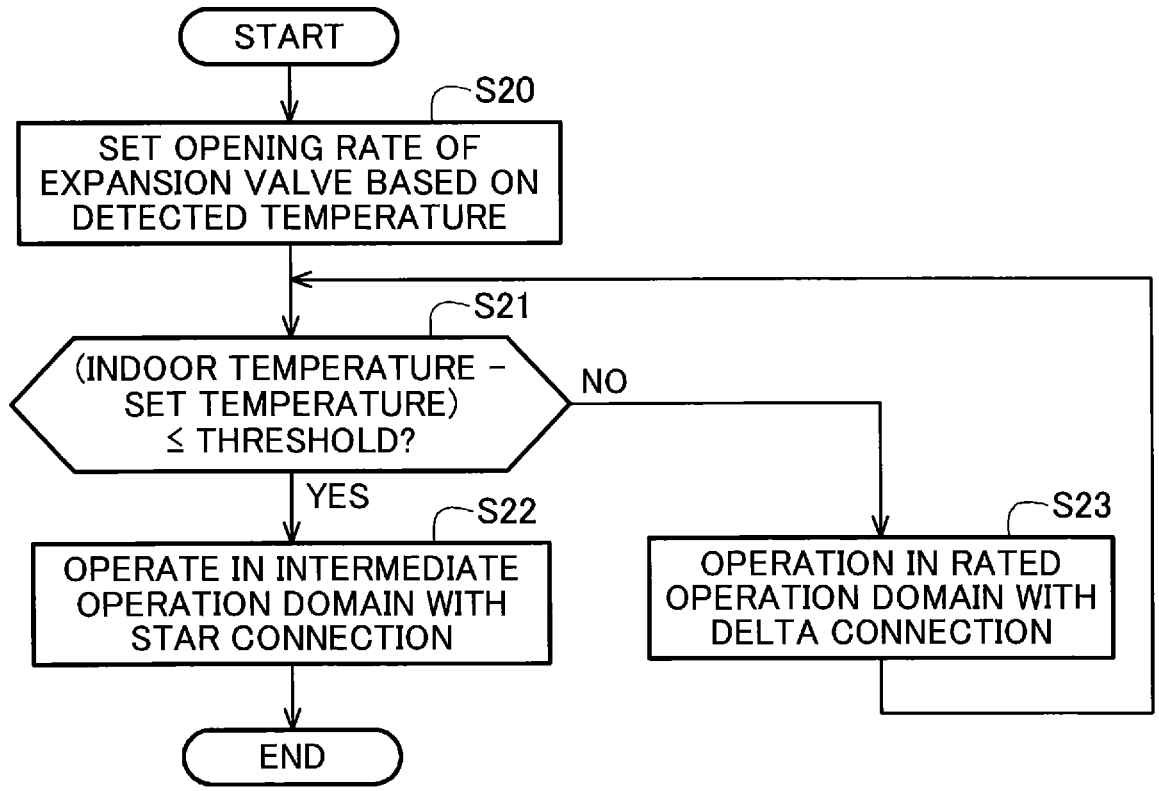
FIG. 12 is a flowchart illustrating an operation of the air conditioner according to the first embodiment in a cooling mode.

FIG. 12 is a flowchart illustrating the operation of the air conditioner 100 according to the first embodiment in the cooling mode.

First, the controller 117 obtains the outdoor heat-exchange intermediate temperature, the indoor heat-exchange intermediate temperature, and the intake temperature respectively from the outdoor-heat-exchange intermediate-temperature detector 118b, the indoor-heat-exchange intermediate-temperature detector 152a, and the intake temperature detector 152b, and sets the opening rate of the expansion valve 114 on the basis of the obtained temperature (step S20).

The controller 117 may obtain the outdoor heat-exchange intermediate temperature, the indoor heat-exchange intermediate temperature, and the intake temperature without operating the air conditioner 100, or obtain the outdoor heat-exchange intermediate temperature, the indoor heat-exchange intermediate temperature, and the intake temperature, for example, after at least one of the indoor fan and the outdoor fan is operated for a predetermined time.

The controller 117 varies the opening rate of the expansion valve 114 set in step S20 in accordance with the subsequent operation state, on the basis of the temperature detected by at least one of the outdoor-heat-exchange intermediate-temperature detector 118b, the indoor-heat-exchange intermediate-temperature detector 152a, and the intake temperature detector 152b.

The controller 117 then determines whether or not the temperature difference between the indoor temperature corresponding to the temperature of the inside of the room in which the indoor unit 150 is installed and set temperature set by the remote controller is smaller than or equal to a predetermined threshold (step S21). The indoor temperature may be any temperature corresponding to the temperature of the inside of the room in which the indoor unit 150 is installed. Here, the controller 117 obtains the intake temperature detected by the intake temperature detector 152b and uses the obtained intake temperature as the indoor temperature. If the temperature difference is smaller than or equal to the predetermined threshold (Yes in step S21), the process proceeds to step S22. If the temperature difference is larger than the predetermined threshold (No in step S21), the process proceeds to step S23.

In step S22, an operation with a low rotational speed can be performed because the temperature difference and the cooling load are small. Therefore, the controller 117 instructs the wiring switch part 116 to switch the wiring state to the star connection and drive the motor 121 in the intermediate operation domain.

In step S23, because the temperature difference and the cooling load are large, an operation with an increased rotational speed needs to be continued until the temperature difference becomes small. Therefore, the controller 117 instructs the wiring switch part 116 to switch the wiring state to the delta connection and drive the motor 121 in the rated operation domain. After the predetermined time has passed, the process returns to step S21.

Figure 13:
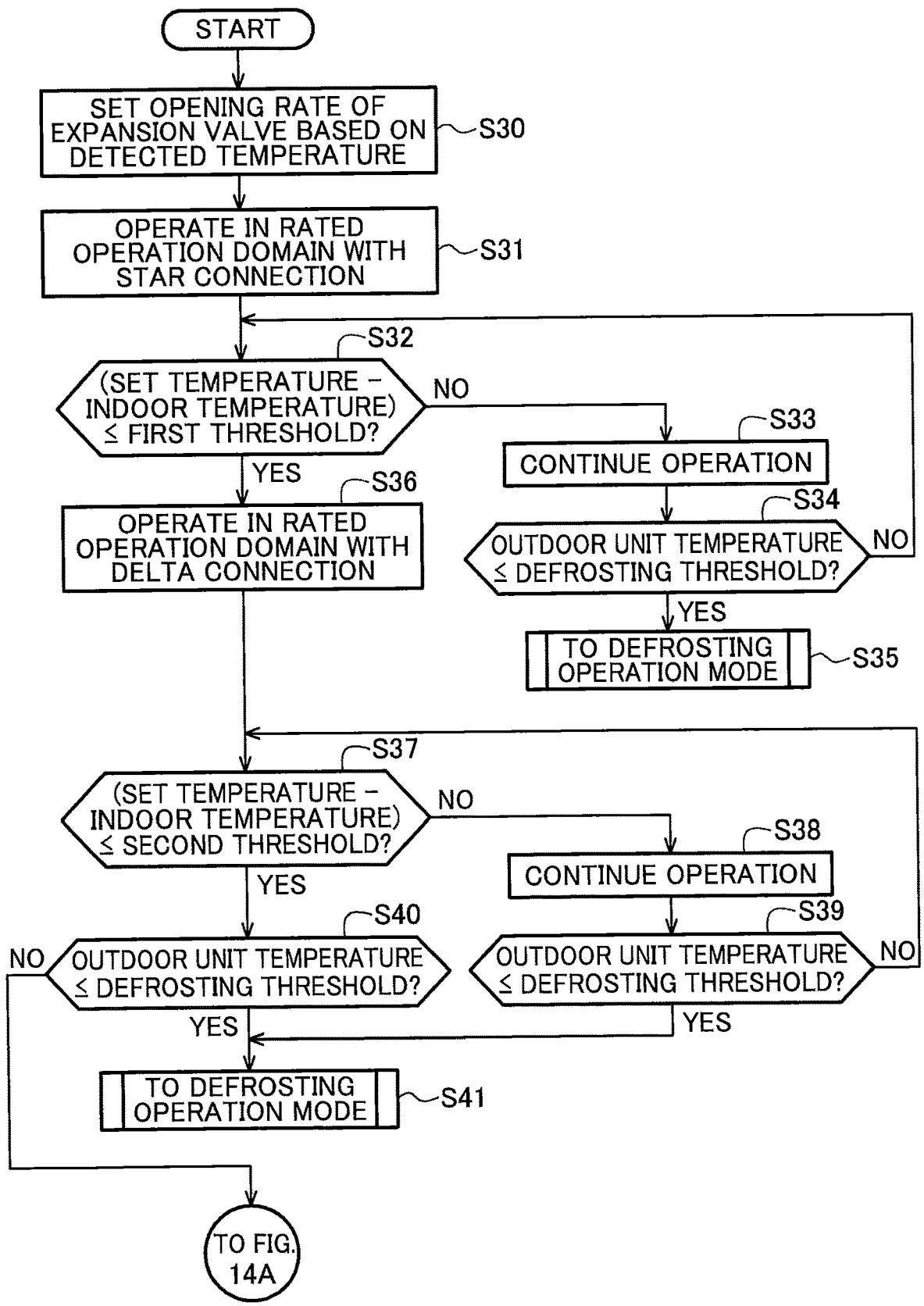
FIG. 13 is a first flowchart illustrating an operation of the air conditioner according to the first embodiment in a heating mode.
Figure 14:
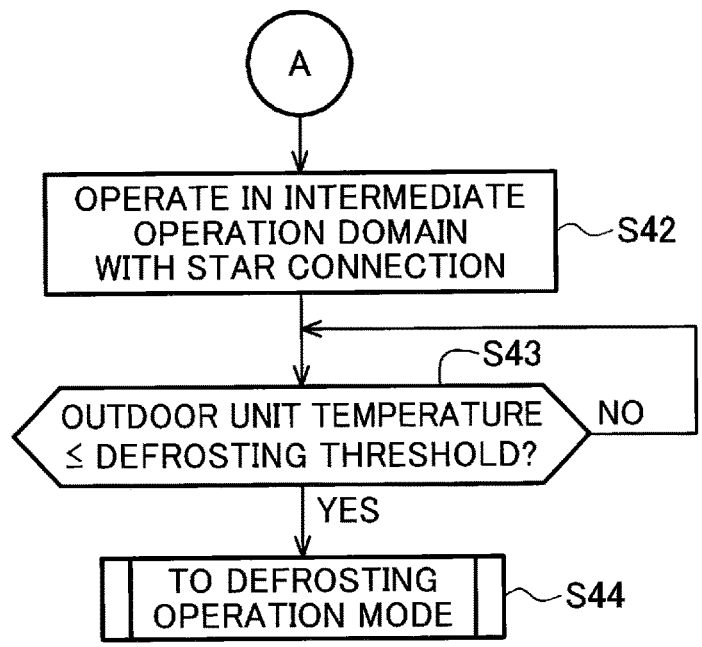
FIG. 14 is a second flowchart illustrating an operation of the air conditioner according to the first embodiment in a heating mode.

FIGS. 13 and 14 are flowcharts illustrating the operation of the air conditioner 100 according to the first embodiment in the heating mode.

First, the controller 117 obtains the outdoor heat-exchange intermediate temperature, the indoor heat-exchange intermediate temperature, and the intake temperature respectively from the outdoor-heat-exchange intermediate-temperature detector 118b, the indoor-heat-exchange intermediate-temperature detector 152a, and the intake temperature detector 152b, and sets the opening rate of the expansion valve 114 on the basis of the obtained temperature (step S30).

The controller 117 may obtain the outdoor heat-exchange intermediate temperature, the indoor heat-exchange intermediate temperature, and the intake temperature without operating the air conditioner 100, or obtain the outdoor heat-exchange intermediate temperature, the indoor heat-exchange intermediate temperature, and the intake temperature, for example, after at least one of the indoor fan and the outdoor fan is operated for a predetermined time.

The controller 117 varies the opening rate of the expansion valve 114 set in step S20 in accordance with the subsequent operation state, on the basis of the temperature detected by at least one of the outdoor-heat-exchange intermediate-temperature detector 118b, the indoor-heat-exchange intermediate-temperature detector 152a, and the intake temperature detector 152b.

The controller 117 then instructs the wiring switch part 116 to switch the wiring state to the star connection and start the heating operation in the rated operation domain (step S31). Here, the controller 117 uses the star connection, which is a connection state having a low efficiency and a large electromotive force, so as to heat the refrigerant with the heat generated by the motor 121. In this way, the indoor temperature can be quickly raised.

The controller 117 then determines whether or not the temperature difference between the set temperature set by the remote controller and the indoor temperature corresponding to the temperature of the inside of the room in which the indoor unit 150 is installed is smaller than or equal to a predetermined first threshold (step S32). If the temperature difference is larger than the predetermined first threshold (No in step S32), the process proceeds to step S33. If the temperature difference is smaller than or equal to the predetermined first threshold (Yes in step S32), the process proceeds to step S36.

In step S33, because the temperature difference is large, the temperature of the refrigerant compressed at the compressor 111 needs to be raised to raise the temperature of the inside of the room. Therefore, the controller 117 continues the wiring state of the star connection. The process then proceeds to step S34.

In step S34, the controller 117 determines whether or not an outdoor unit temperature corresponding to the temperature of the outdoor heat exchanger 113 of the outdoor unit 110 is lower than or equal to a defrosting threshold, which is a predetermined temperature. The outdoor unit temperature may be any temperature corresponding to the temperature of the outdoor heat exchanger 113 of the outdoor unit 110. Here, the controller 117 obtains the outdoor heat-exchange intermediate temperature from the outdoor-heat-exchange intermediate-temperature detector 118b and uses the obtained outdoor heat-exchange intermediate temperature as the outdoor unit temperature. If the outdoor unit temperature is lower than or equal to the defrosting threshold (Yes in step S34), the process proceeds to step S35. If the outdoor unit temperature is higher than the defrosting threshold (No in step S34), the process returns to step S32.

In step S35, the controller 117 operates the air conditioner 100 in the defrosting operation mode. This process will be explained below in detail with reference to FIG. 15.

In step S36, although the temperature difference is becoming small, because the heating load is still large, an operation with an increased rotational speed needs to be performed. Therefore, the controller 117 instructs the wiring switch part 116 to switch the wiring state to the delta connection and performs the heating operation in the rated operation domain. The process then proceeds to step S37.

In step S37, the controller 117 determines whether or not the temperature difference between the set temperature and the indoor temperature is smaller than or equal to a predetermined second threshold. If the temperature difference is larger than the predetermined second threshold (No in step S37), the process proceeds to step S38. If the temperature difference is smaller than or equal to the predetermined second threshold (Yes in step S37), the process proceeds to step S40.

In step S38, because the temperature difference is still large, an operation with an increased rotational speed needs to be continued. Therefore, the controller 117 continues the wiring state of the delta connection, which is a connection state having a small electromotive force. The process then proceeds to step S39.

In step S39, the controller 117 determines whether or not the outdoor unit temperature is lower than or equal to the defrosting threshold. If the outdoor unit temperature is lower than or equal to the defrosting threshold (Yes in step S39), the process proceeds to step S41. If the outdoor unit temperature is higher than the defrosting threshold (No in step S39), the process returns to step S37.

In step S40, the controller 117 determines whether or not the outdoor unit temperature is lower than or equal to the defrosting threshold. If the outdoor unit temperature is lower than or equal to the defrosting threshold (Yes in step S40), the process proceeds to step S41. If the outdoor unit temperature is higher than the defrosting threshold (No in step S40), the process proceeds to step S42 in FIG. 14.

In step S41, the controller 117 operates the air conditioner 100 in the defrosting operation mode. This process will be explained below in detail with reference to FIG. 15.

In step S42 in FIG. 14, because the temperature difference between the indoor temperature, the set temperature has decreased, and the heating load has become small; an operation with a lowered rotational speed can be performed. Therefore, the controller 117 instructs the wiring switch part 116 to switch the wiring state to the star connection and performs the heating operation in the intermediate operation domain.

The controller 117 then determines whether or not the outdoor unit temperature is lower than or equal to the defrosting threshold (step S43). If the outdoor unit temperature is lower than or equal to the defrosting threshold (Yes in step S43), the process proceeds to step S44.

In step S44, the controller 117 operates the air conditioner 100 in the defrosting operation mode. This process will be explained below in detail with reference to FIG. 15.

Note that the first threshold and the second threshold in FIGS. 13 and 14 may be any values that satisfy the condition "first threshold>second threshold." Incidentally, the second threshold is a threshold for switching the intermediate operation domain and the rated operation domain. It is desirable that the second threshold be the temperature difference corresponding to the rotational speed at the crosspoint of the efficiency of the delta connection and the efficiency of the star connection, as described above.

Figure 15:
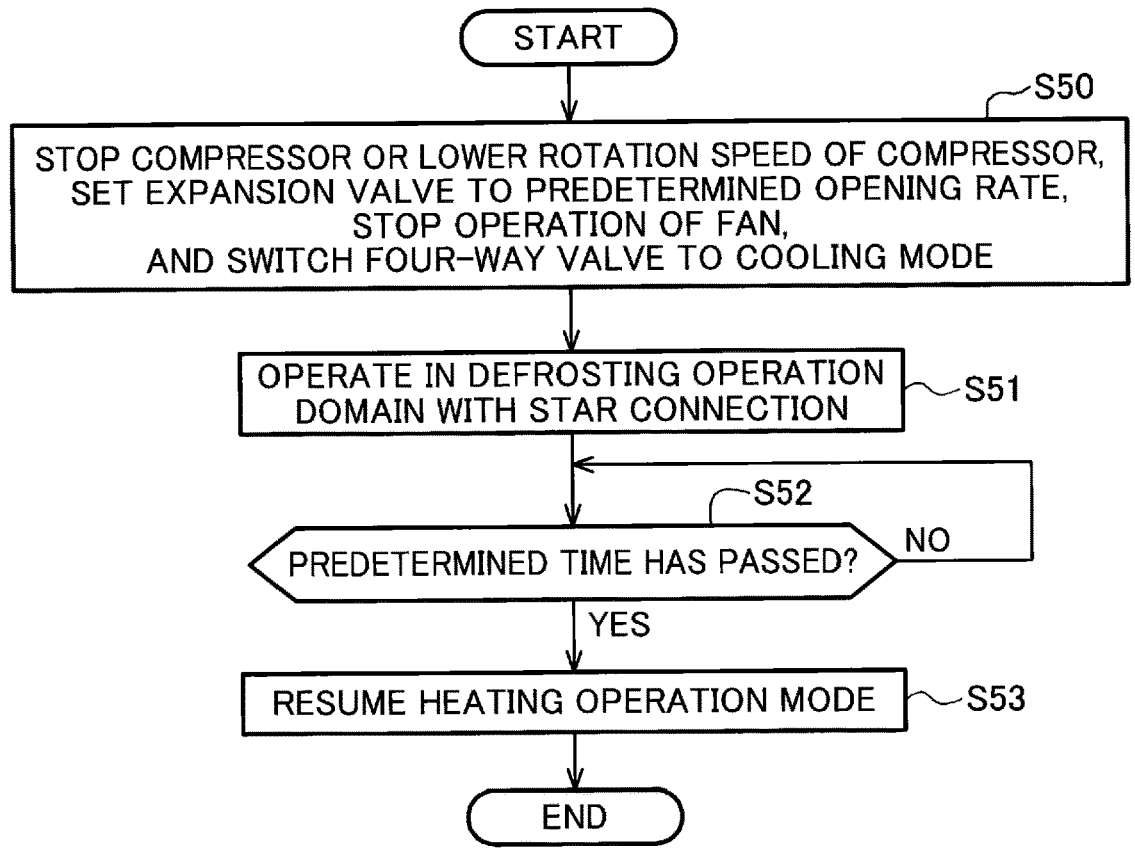
FIG. 15 is a flowchart illustrating an operation of the air conditioner according to the first embodiment in a defrosting operation mode.

FIG. 15 is a flowchart illustrating the operation of the air conditioner 100 according to the first embodiment in the defrosting operation mode.

First, in order to switch the operation mode, the controller 117 stops the compressor 111 or lowers the rotational speed of the compressor 111, sets the expansion valve 114 to a predetermined opening rate, stops the operation of the indoor fan and the outdoor fan, and switches the four-way valve 112 to the cooling mode (step S50).

The controller 117 then instructs the wiring switch part 116 to switch the wiring state to the star connection and starts the defrosting operation in a defrosting operation domain (step S51). Here, the defrosting operation domain is a domain in which the rotational speed of the motor 121 is higher than the rotational speed corresponding to the rated speed.

The controller 117 then determines whether or not the defrosting operation has been continued for a predetermined time (step S52). If the defrosting operation has not been continued for the predetermined time (No in step S52), the process returns to step S52. If the defrosting operation has been continued for the predetermined time (Yes in step S52), the process proceeds to step S53.

In step S53, the controller 117 switches the operation mode from the defrosting operation mode to the heating operation mode. For example, if the temperature difference between the indoor temperature and the set temperature is larger than the first threshold, the controller 117 causes the process to return to step S31 in FIG. 13. If the temperature difference is smaller than or equal to the first threshold and larger than the second threshold, the controller 117 causes the process to return to step S36 in FIG. 13. If the temperature difference is smaller than or equal to the second threshold, the controller 117 causes the process to return to step S42 in FIG. 14.

Note that, in step S52 in FIG. 15, the controller 117 determines whether or not the predetermined time has passed. However, in the case where a temperature detector that can detect the temperature of the outdoor heat exchanger 113 is provided to the outdoor heat exchanger 113, which is the object to be defrosted, the controller 117 may switch the operation mode to the heating operation mode when the temperature detected by the temperature detector reaches or exceeds a defrosting complete threshold, which is a predetermined temperature.

Figure 16:
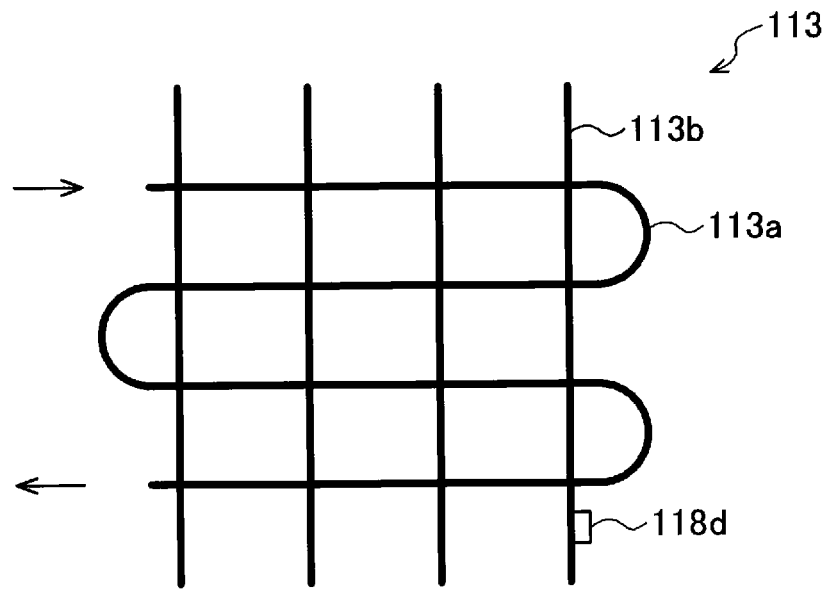
FIG. 16 is a schematic diagram illustrating an installation example of a fan temperature detector.

For example, as illustrated in FIG. 16, the outdoor heat exchanger 113 may include a tube 113a through which the refrigerant flows, fins 113b that discharge or absorb heat, and a fin-temperature detector 118d that detects the fin temperature, which is the temperature of the fins 113b. In such a case, the controller 117 may switch the operation mode to the heating operation mode when the fin temperature detected by the fin-temperature detector 118d reaches or exceeds the defrosting complete threshold.

Note that the defrosting complete threshold may be any temperature that confirms the completion of the defrosting and the defrosting complete threshold is higher than the defrosting threshold. For example, if the defrosting threshold is 0° C., the defrosting complete threshold may be 1° C. It is desirable that the fin-temperature detector 118d be fixed to the lower portion of the fins 113b, where frost readily forms and is difficult to remove.

In the case where such a fin-temperature detector 118d is provided, the outdoor unit temperature used in steps S34, S39, and S40 in FIG. 13 and step S43 in FIG. 14 may be the temperature detected by the fin-temperature detector 118d.

Figure 17:
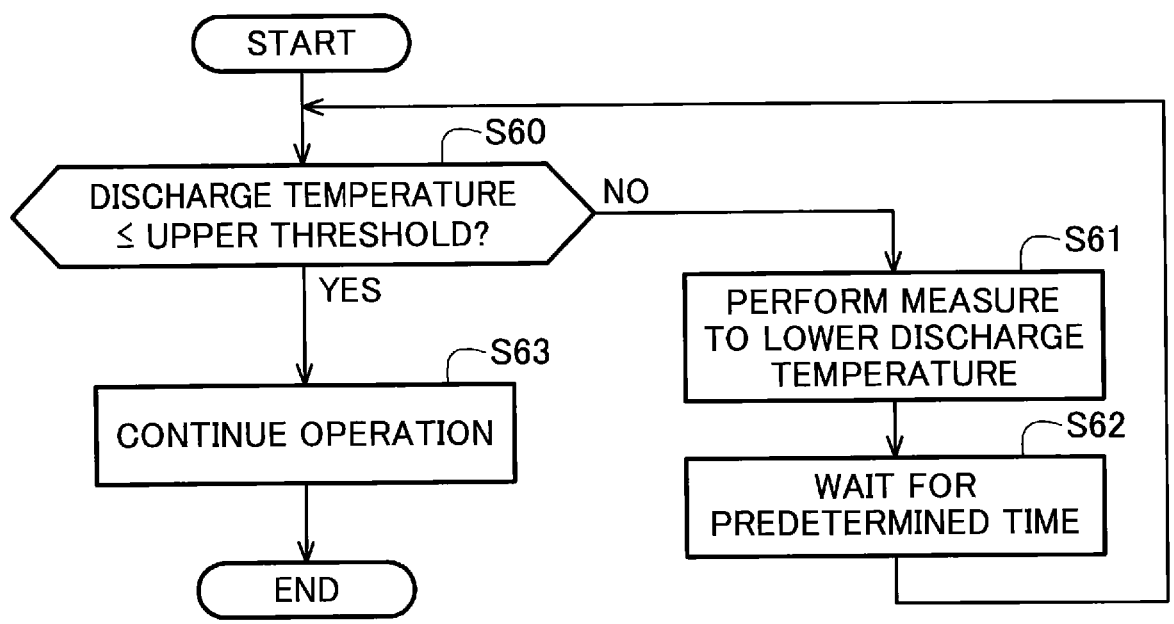
FIG. 17 is a flowchart illustrating a heat resisting temperature determining process of the air conditioner according to the first embodiment.

FIG. 17 is a flowchart illustrating a heat resisting temperature determining process of the air conditioner 100 according to the first embodiment.

The heat resisting temperature determining process is performed in parallel with the cooling operation mode, the heating operation mode, or the defrosting operation mode.

First, the controller 117 determines whether or not the discharge temperature detected by the discharge temperature detector 118a is lower than or equal to an upper threshold, which is a predetermined threshold temperature (step S60). The upper threshold is the heat resisting temperature for the safe operation of the compressor 111. If the discharge temperature is higher than the upper threshold (No in step S60), the process proceeds to step S61. If the discharge temperature is lower than or equal to the upper threshold (Yes in step S60), the process proceeds to step S62.

In step S61, the controller 117 takes measures to lower the discharge temperature. The measures taken by the controller 117 include, for example, decreasing the rotational speed of at least one of the indoor fan and the outdoor fan, increasing the opening rate of the expansion valve 114, increasing the rotational speed of the compressor 111, or switching the wiring state of the wiring switch part 116. Specifically, the controller 117 preliminarily determines the priority order of such measures, and executes the measures in the order of descending priority so as to lower the discharge temperature.

The controller 117 then waits for a predetermined time (step S62) and causes the process to return to step S60.

In step S63, the controller 117 continues the operation in the cooling operation mode, the heating operation mode, or the defrosting operation mode. Note that it is desirable that the measures executed in step S61 be continued.

As explained in the first embodiment above, the annual performance factor (APF) can be improved by switching between the delta connection and the star connection. The delta connection has a small electromotive force and motor efficiency that peaks during a high-load rated operation at a high rotational speed. The star connection has a large electromotive force and motor efficiency that peaks during a low-load intermediate operation at a low rotational speed.

In the defrosting operation, by impairing the efficiency with the use of the star connection, the refrigerant can be heated by the heat of the motor 121, and the discharge temperature can be raised. The rise in the discharge temperature causes an increase in the temperature difference between the refrigerant flowing to the outdoor heat exchanger 113 during defrosting and the frost, and thereby the defrosting time can be reduced. The reduction in the defrosting time can attenuate the hot or cold feeling experienced by the user during defrosting.

At the start of the heating operation, by operating in the star connection with impaired efficiency, the refrigerant can be heated with the heat of the motor 121, and the discharge temperature can be raised. In this way, the blowoff temperature is raised at the start of the heating operation, and thereby the heating capability at the start of the heating operation can be enhanced. The rise in the blowoff temperature and the enhancement of the heating capability enables the room temperature to be raised in a short time.

Even when the intake temperature is small at the start of the heating operation or during the defrosting operation, the discharge temperature can be raised. Therefore, the density of the refrigerant sucked into the compressor 111 increases, and thereby the discharge circulation flow rate can be increased.

The increase in the circulation flow rate and the raise in the discharge temperature leads to the enhancement of the heating capability of the indoor heat exchanger 151.

By switching the wiring state of the wiring switch part 116, the peak of efficiency relative to the rotational speed of the motor 121 can be significantly shifted, and, by shifting the phase of the three-phase AC current output from the inverter 115, the peak point of efficiency can be shifted. Therefore, impairment in efficiency due to a difference between the rotational speed in the cooling operation and the rotational speed in the heating operation during the rated operation and the intermediate operation can be prevented, and the efficiency can peak or nearly peak in each of the rated operation and the intermediate operation. In this way, the APF can be improved.

According to the first embodiment, the discharge temperature of the compressor 111 is controlled to be lower than or equal to the heat resisting temperature of the compressor 111, and thereby the reliability of the compressor 111 can be improved.

Therefore, even when a different refrigerant, such as an HFC refrigerant, an HC refrigerant, an HFO refrigerant, a natural refrigerant, or a mixture of these refrigerants is enclosed, safety can be maintained while the discharge temperature is increased to a higher temperature. Therefore, the defrosting time can be reduced, or the blowoff temperature can be increased to a high temperature during the defrosting operation or at the start of the heating operation.

Note that, in the flowcharts of the heating mode in FIGS. 13 and 14, the wiring state is switched to the star connection, and the heating operation is started in step S30 after the opening rate of the expansion valve 114 has been set in step S30. However, the first embodiment is not limited to such an example.

Figure 18:
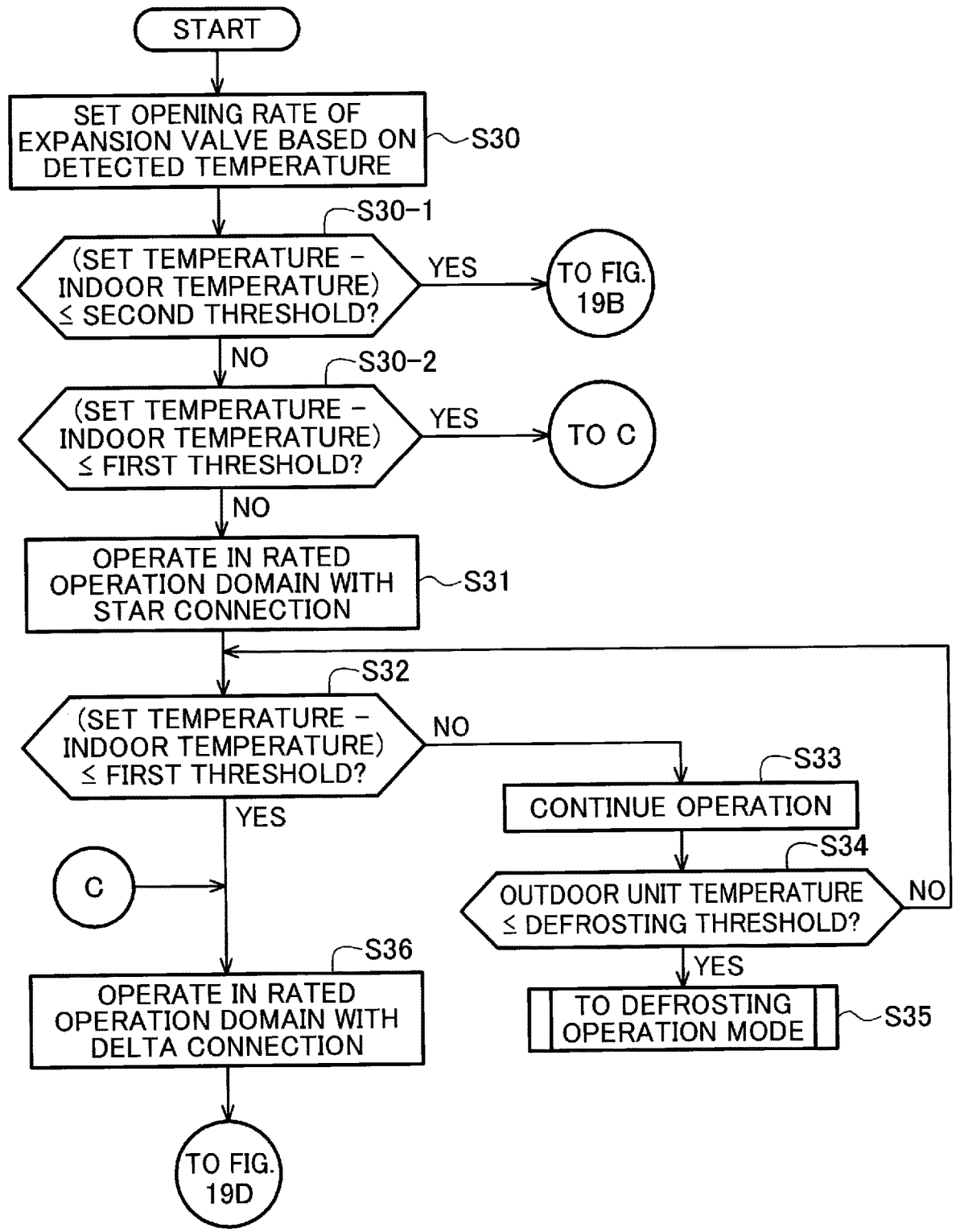
FIG. 18 is a first flowchart illustrating a modified example of an operation of the air conditioner according to the first embodiment in a heating mode.
Figure 19:
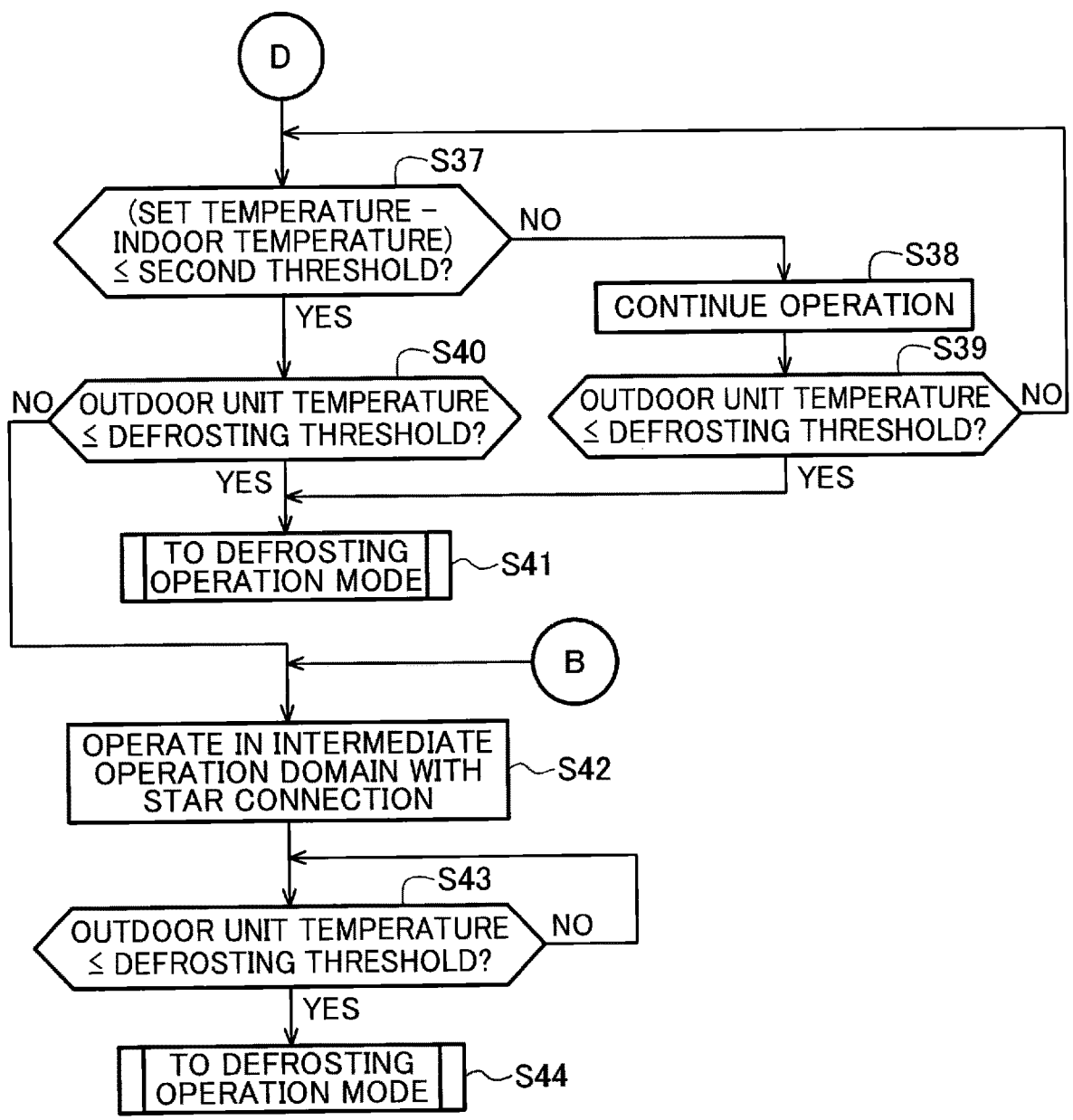
FIG. 19 is a second flowchart illustrating a modified example of an operation of the air conditioner according to the first embodiment in a heating mode.

For example, FIGS. 18 and 19 are flowcharts illustrating a modified example of the operation of the air conditioner 100 according to the first embodiment in the heating mode.

As illustrated in FIG. 18, in this modified example, compared with the flowchart in FIG. 13, steps S30-1 and S30-2 are inserted between steps S30 and S31 for switching the wiring state at the start of the heating operation in accordance with the temperature difference between the set temperature and the indoor temperature.

In step S30-1, the controller 117 determines whether or not the temperature difference between the set temperature and the indoor temperature is smaller than or equal to a predetermined second threshold. If the temperature difference is larger than the predetermined second threshold (No in step S30-1), the process proceeds to step S30-2. If the temperature difference is smaller than or equal to the predetermined second threshold (Yes in step S30-1), the process proceeds to step S42 in FIG. 19. In step S42, the controller 117 instructs the wiring switch part 116 to switch the wiring state to the star connection and starts the heating operation.

In step S30-2, the controller 117 determines whether or not the temperature difference between the set temperature and the indoor temperature is smaller than or equal to a predetermined first threshold. If the temperature difference is larger than the predetermined first threshold (No in step S30-2), the process proceeds to step S36. In step S36, the controller 117 instructs the wiring switch part 116 to switch the wiring state to the delta connection and starts the heating operation. If the temperature difference is smaller than or equal to the predetermined second threshold (Yes in step S30-2), the process proceeds to step S31. In step S31, the controller 117 instructs the wiring switch part 116 to switch the wiring state to the star connection and starts the heating operation.

According to the modified exampled explained above with reference to FIGS. 18 and 19, the heating operation can be started in the optimum wiring state in accordance with the temperature difference between the set temperature and the indoor temperature. Even in this case, when the temperature difference between the set temperature and the indoor temperature is large, and there is a desire to quickly raise the indoor temperature, the star connection having low efficiency can be deliberately used to heat the refrigerant with the heat generated by the motor 121.

Second Embodiment

As illustrated in FIG. 1, an air conditioner 200 functioning as a refrigerating cycle device according to a second embodiment includes an outdoor unit 210 and an indoor unit 150.

The indoor unit 150 according to the second embodiment is the same as the indoor unit 150 according to the first embodiment.

The outdoor unit 210 according to the second embodiment includes a compressor 211, a four-way valve 112, an outdoor heat exchanger 113, an expansion valve 114, an inverter 115, a wiring switch part 216, a controller 217, a discharge temperature detector 118a, an outdoor-heat-exchange intermediate-temperature detector 118b, and an intake temperature detector 118c.

The four-way valve 112, the outdoor heat exchanger 113, the expansion valve 114, the inverter 115, the discharge temperature detector 118a, the outdoor-heat-exchange intermediate-temperature detector 118b, and the intake temperature detector 118c according to the second embodiment are respectively the same as the four-way valve 112, the outdoor heat exchanger 113, the expansion valve 114, the inverter 115, the discharge temperature detector 118a, the outdoorheat-exchange intermediate-temperature detector 118b, and the intake temperature detector 118c according to the first embodiment.

As illustrated in FIG. 2, the compressor 211 includes, in an airtight container 119, a compression mechanism 120 compressing the refrigerant and a motor 221 applying power to the compression mechanism 120.

The airtight container 119 and the compression mechanism 120 according to the second embodiment are respectively the same as the airtight container 119 and the compression mechanism 120 according to the first embodiment.

Figure 20:
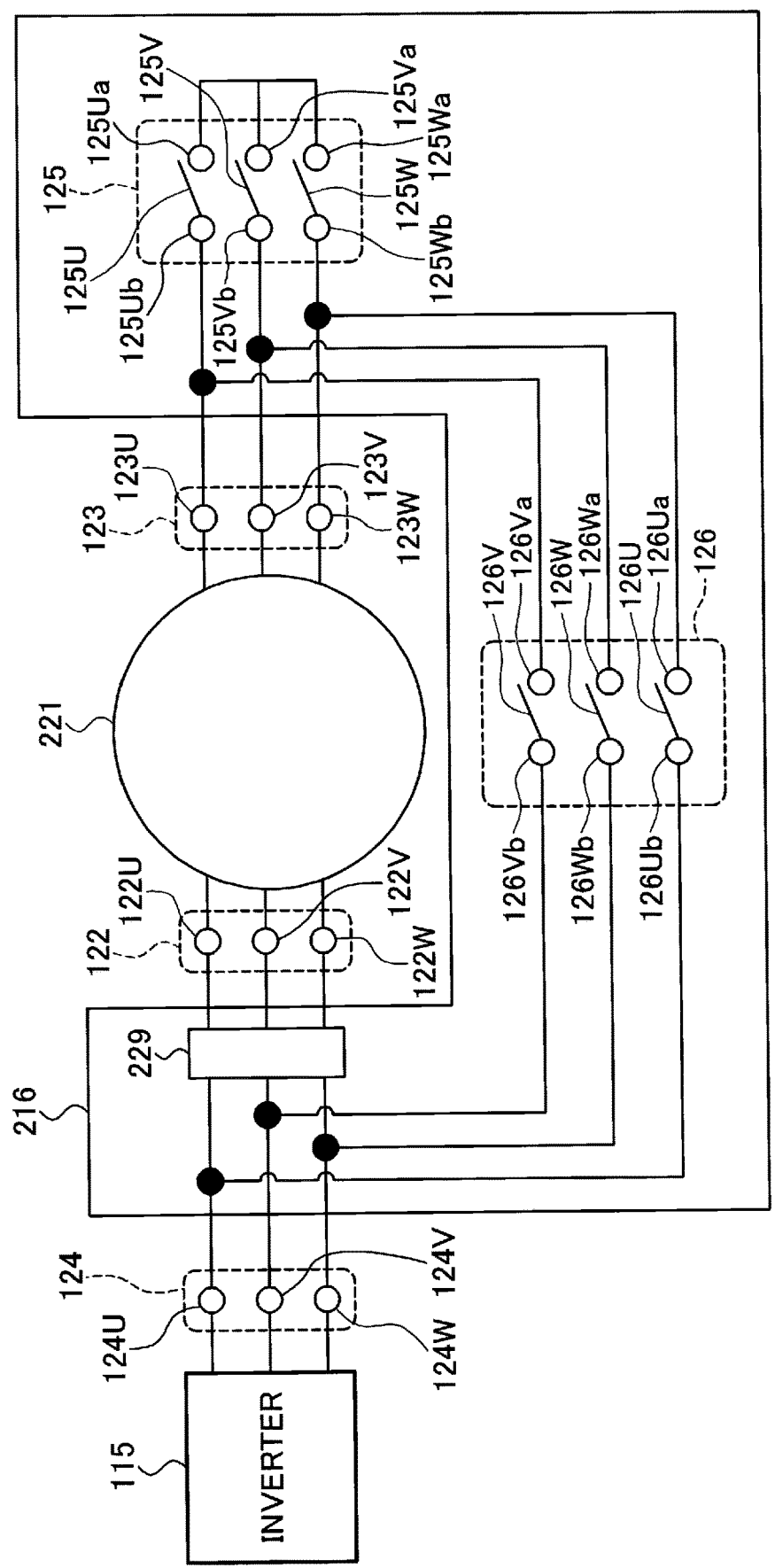
FIG. 20 is a schematic diagram illustrating the connection relation of an inverter, a wiring switch part, and a motor in the second embodiment.

FIG. 20 is a schematic diagram illustrating the connection relation of the inverter 115, the wiring switch part 216, and the motor 221.

Figure 21:
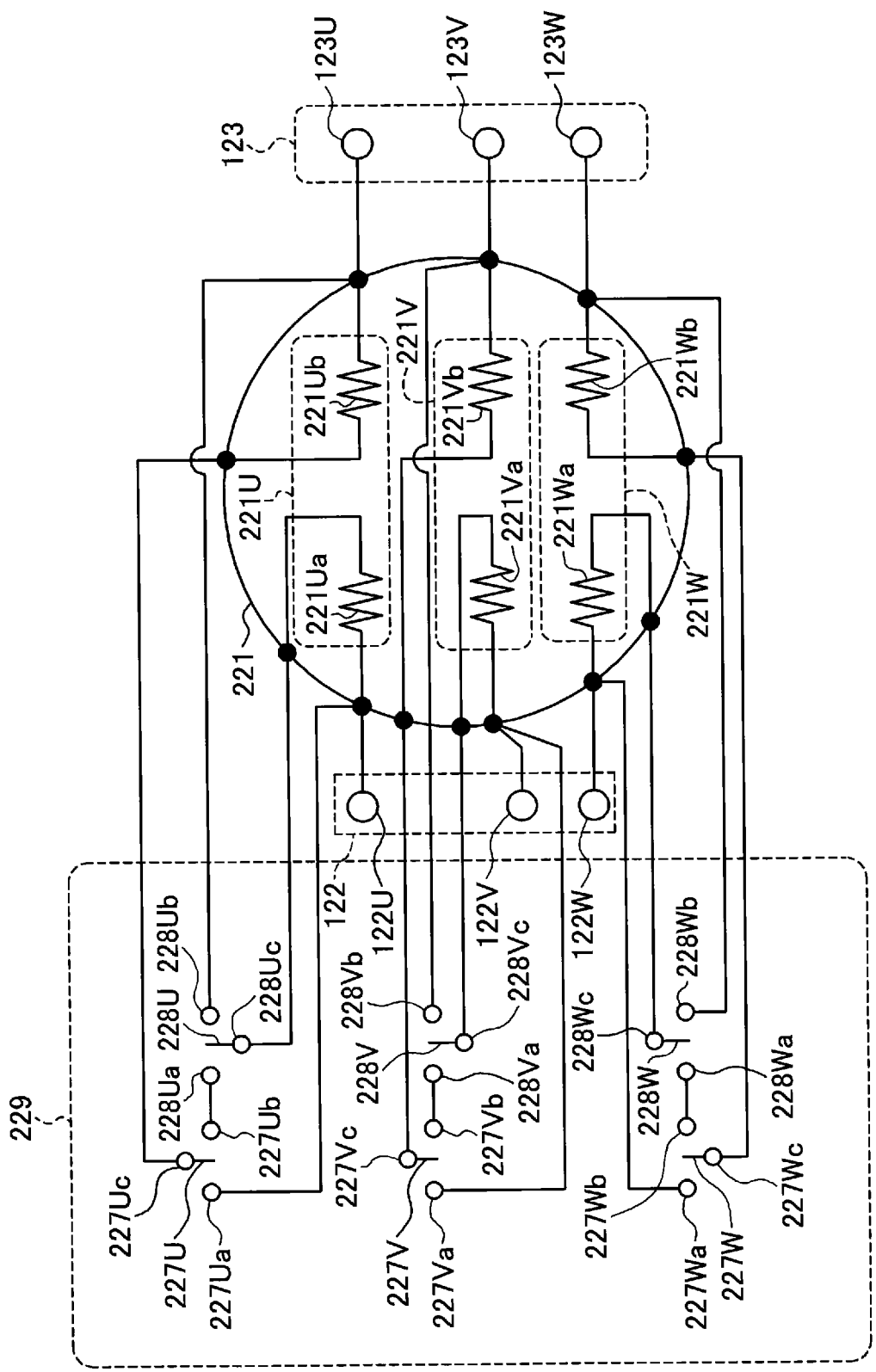
FIG. 21 is a schematic diagram illustrating the connection relation for switching a wiring state in the second embodiment.

FIG. 21 is a schematic diagram illustrating the connection relation for switching the wiring state.

FIGS. 22A to 22D are schematic diagrams illustrating the wiring state of the motor 221.

As illustrated in FIG. 20, the motor 221 is coupled to a first terminal 122 and a second terminal 123. The first terminal 122 is coupled to an output terminal 124 of the inverter 115.

The wiring switch part 216 is coupled between the first terminal 122 and the output terminal 124 and to the second terminal 123. A first switch 125 and a second switch 126 switch between a star connection and a delta connection, as in the first embodiment.

Note that, in the second embodiment, the wiring switch part 216 includes a series-parallel switch 229 that switches each of the U-phase, V-phase, and W-phase wirings between a series connection and a parallel connection. Detail of the wiring switch part 216 will now be described with reference to FIG. 21.

In FIG. 21, the motor 221 is a three-phase permanent magnet type motor.

The motor 221 includes a U-phase wiring 221U as a wiring for U-phase, V-phase wiring 221V as a wiring for V-phase, and a W-phase wiring 221W as a wiring for W-phase.

The U-phase wiring 221U includes a first U-phase wiring 221Ua and a second U-phase wiring 221Ub.

One end of the first U-phase wiring 221Ua is coupled to a first U-phase terminal 122U and a first U-phase switching terminal 227Ua. The other end of the first U-phase wiring 221Ua is coupled to a second U-phase common terminal 228Uc.

One end of the second U-phase wiring 221Ub is coupled to a first U-phase common terminal 227Uc. The other end of the second U-phase wiring 221Ub is coupled to a fourth U-phase switching terminal 228Ub and the second U-phase terminal 123U.

A second U-phase switching terminal 227Ub is coupled to a third U-phase switching terminal 228Ua.

With the above-described configuration, a first U-phase series-parallel switch 227U couples the first U-phase common terminal 227Uc and the second U-phase switching terminal 227Ub, and a second U-phase series-parallel switch 228U couples the second U-phase common terminal 228Uc and the third U-phase switching terminal 228Ua. As a result, the first U-phase wiring 221Ua and the second U-phase wiring 221Ub are connected in series.

The first U-phase series-parallel switch 227U couples the first U-phase common terminal 227Uc and the first U-phase switching terminal 227Ua, and the second U-phase series-parallel switch 228U couples the second U-phase common terminal 228Uc and the fourth U-phase switching terminal 228Ub. As a result, the first U-phase wiring 221Ua and the second U-phase wiring 221Ub are connected in parallel.

The V-phase wiring 221V includes a first V-phase wiring 221Va and a second V-phase wiring 221Vb.

One end of the first V-phase wiring 221Va is coupled to a first V-phase terminal 122V and a first V-phase switching terminal 227Va. The other end of the first V-phase wiring 221Va is coupled to a second V-phase common terminal 228Vc.

One end of the second V-phase wiring 221Vb is coupled to a first V-phase common terminal 227Vc. The other end of the second V-phase wiring 221Vb is coupled to a fourth V-phase switching terminal 228Ub and a second V-phase terminal 123V.

A second V-phase switching terminal 227Vb is coupled to a third V-phase switching terminal 228Va.

With the above-described configuration, a first V-phase series-parallel switch 227V couples the first V-phase common terminal 227Vc and the second V-phase switching terminal 227Vb, and a second V-phase series-parallel switch 228V couples the second V-phase common terminal 228Vc and the third V-phase switching terminal 228Va. As a result, the first V-phase wiring 221Va and the second V-phase wiring 221Vb are connected in series.

The first V-phase series-parallel switch 227V couples the first V-phase common terminal 227Vc and the first V-phase switching terminal 227Va, and the second V-phase series-parallel switch 228V couples the second V-phase common terminal 228Vc and the fourth V-phase switching terminal 228Vb. As a result, the first V-phase wiring 221Va and the second V-phase wiring 221Vb are connected in parallel.

The W-phase wiring 221W includes a first W-phase wiring 221Wa and a second W-phase wiring 221Wb.

One end of the first W-phase wiring 221Wa is coupled to a first W-phase terminal 122W and a first W-phase switching terminal 227Wa. The other end of the first W-phase wiring 221Wa is coupled to a second W-phase common terminal 228Wc.

One end of the second W-phase wiring 221Wb is coupled to a first W-phase common terminal 227Wc. The other end of the second W-phase wiring 221Wb is coupled to a fourth W-phase switching terminal 228Wb and a second W-phase terminal 123W.

A second W-phase switching terminal 227Wb is coupled to a third W-phase switching terminal 228Wa.

With the above-described configuration, a first W-phase series-parallel switch 227W couples the first W-phase common terminal 227Wc and the second W-phase switching terminal 227Wb, and a second W-phase series-parallel switch 228W couples the second W-phase common terminal 228Wc and the third W-phase switching terminal 228Wa. As a result, the first W-phase wiring 221Wa and the second W-phase wiring 221Wb are connected in series.

The first W-phase series-parallel switch 227W couples the first W-phase common terminal 227Wc and the first W-phase switching terminal 227Wa, and a second W-phase series-parallel switch 228W couples the second W-phase common terminal 228Wc and the fourth W-phase switching terminal 228Wb. As a result, the first W-phase wiring 221Wa and the second W-phase wiring 221Wb are connected in parallel.

Figure 22A:
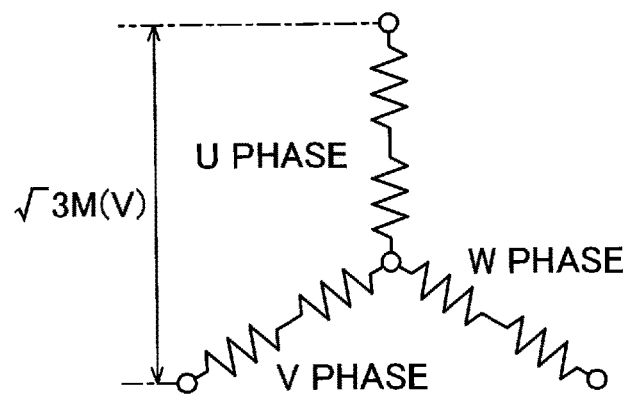
FIGS. 22A to 22D are schematic diagrams illustrating wiring states of a motor in the second embodiment.
Figure 22B:
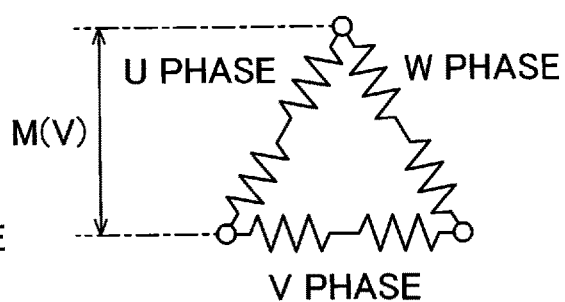
Figure 22C:
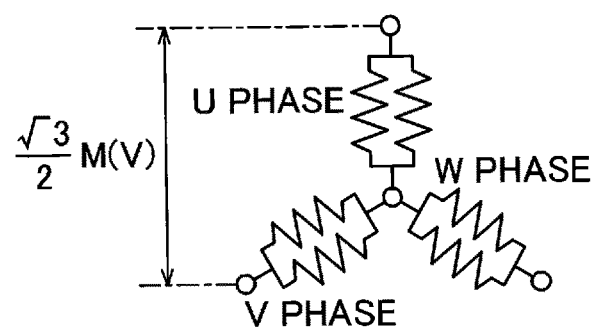
Figure 22D:
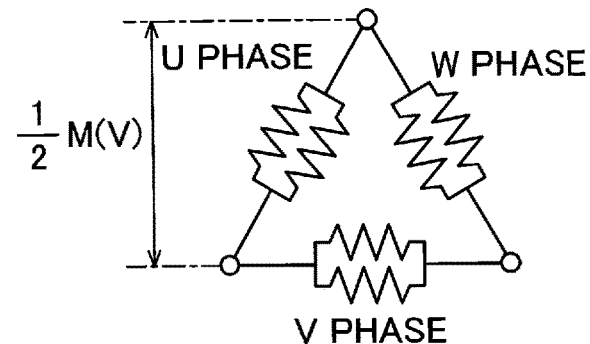

With the above-described configuration, when the first switch 125 is closed and the second switch 126 is opened while the series-parallel switch 229 connects the wirings of each phase in series, the wiring state of the motor 221 is switched to a series star connection, as illustrated in FIG. 22A. In the series star connection, multiple wirings are connected in series in each phase. When the first switch 125 is opened and the second switch 126 is closed while the series-parallel switch 229 connects the wirings of each phase in series, the wiring state of the motor 121 is switched to a series delta connection, as illustrated in FIG. 22B. In the series delta connection, multiple wirings are connected in series in each phase. When the first switch 125 is closed and the second switch 126 is opened while the series-parallel switch 229 connects the wirings of each phase in parallel, the wiring state of the motor 221 is switched to a parallel star connection, as illustrated in FIG. 22C. In the parallel star connection, multiple wirings are connected in parallel in each phase. When the first switch 125 is opened and the second switch 126 is closed while the series-parallel switch 229 connects the wirings of each phase in parallel, the wiring state of the motor 121 is switched to a parallel delta connection, as illustrated in FIG. 22D. In the parallel delta connection, multiple wirings are connected in parallel in each phase.

Note that, in the above, the wirings of each phase consist of two wirings connected in series or in parallel. However, the second embodiment is not limited to such a configuration example. For example, the wirings of each phase may include three or more wirings connected in series or in parallel.

Figure 23A:
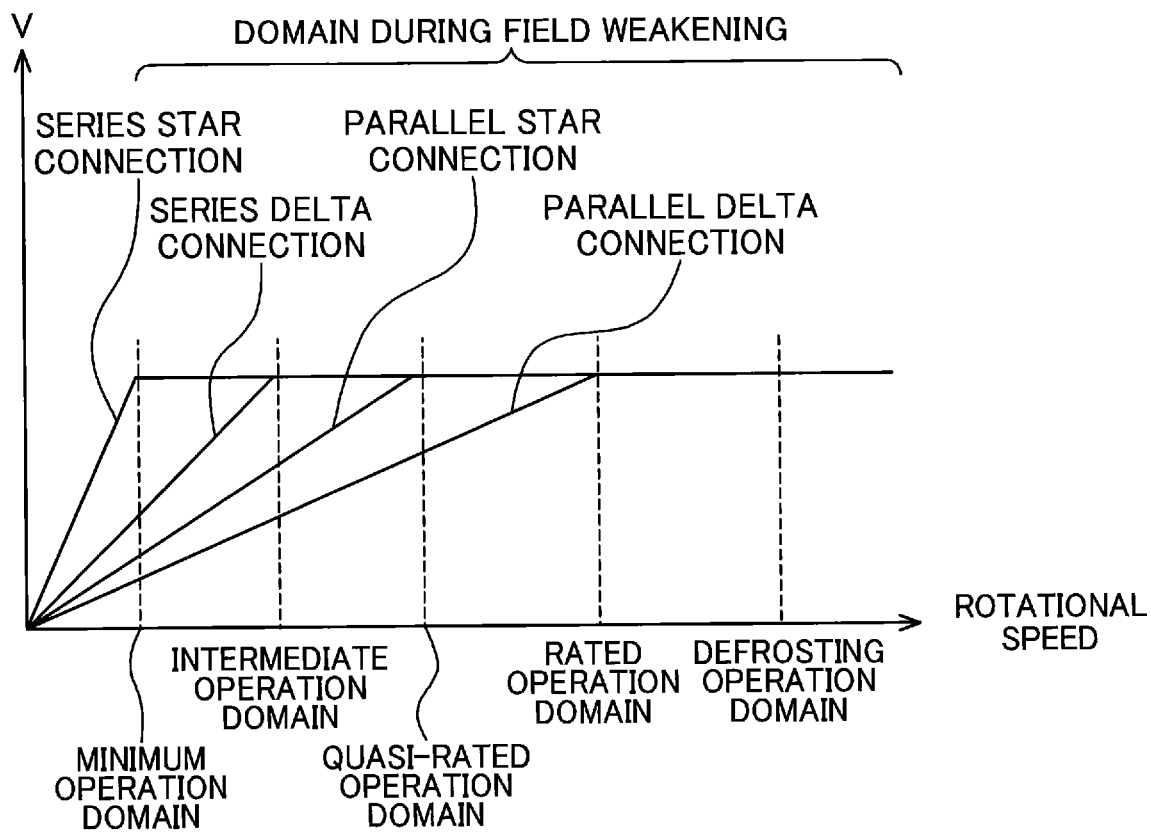
FIGS. 23A and 23B are schematic diagrams illustrating the relation of the rotational speed of a compressor to voltage and combined efficiency in the second embodiment.
Figure 23B:
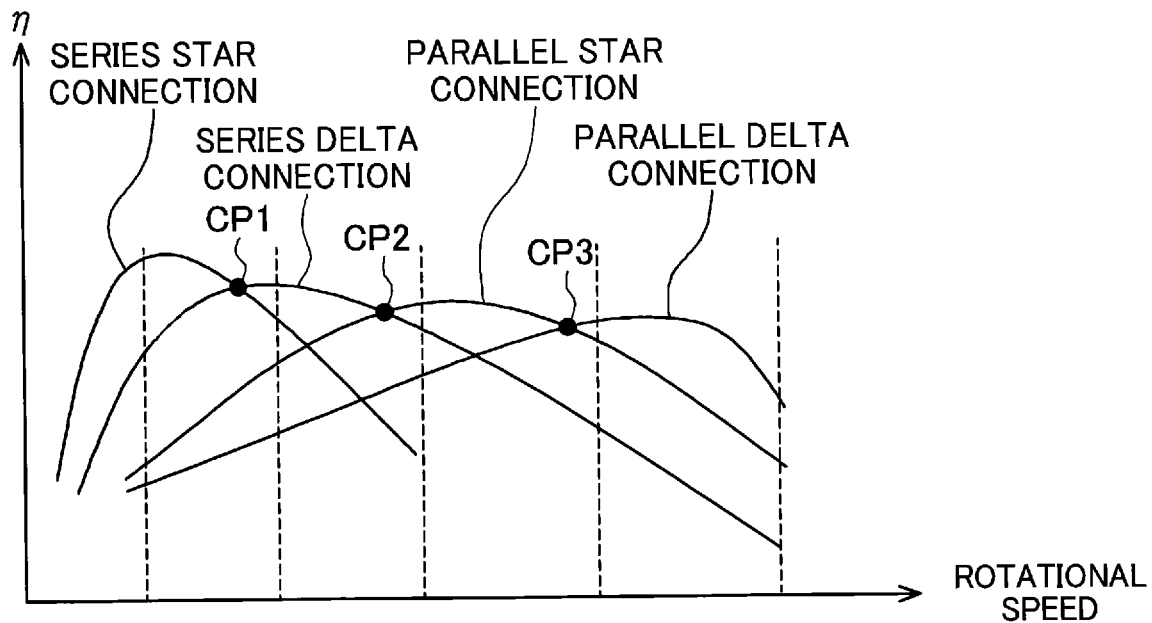

FIGS. 23A and 23B are schematic diagrams illustrating the relation of the rotational speed of the compressor 211 to voltage and combined efficiency. FIG. 23A illustrates the relation between rotational speed and voltage. FIG. 23B illustrates the relation between rotational speed and combined efficiency.

As illustrated in FIG. 23A, voltage is substantially proportional to rotational speed. Operation is possible up to a rotational speed at which the voltage reaches the maximum inverter output voltage. As illustrated in FIG. 23A, in the case of the series star connection, the voltage reaches the maximum inverter output voltage in a minimum operation domain; in the case of the series delta connection, the voltage reaches the maximum inverter output voltage in an intermediate operation domain; in the case of the parallel star connection, the voltage reaches the maximum inverter output voltage in a quasi-rated operation domain; and in the case of the parallel delta connection, a rated operation domain voltage reaches the maximum inverter output voltage.

When the operation exceeds a rotational speed higher than the rotational speed at which the voltage reaches the maximum output voltage, field weakening control for suppressing the voltage is performed to increase the output voltage of the inverter and increase the rotational speed limit.

As illustrated in FIG. 23B, the combined efficiency η peaks in the minimum operation domain with the series star connection, in the intermediate operation domain with the series delta connection, in the quasi-rated operation domain with the parallel star connection, and in the rated operation domain with the parallel delta connection. In a defrosting operation domain, the combined efficiency η decreases in the order of the parallel delta connection, the parallel star connection, the series delta connection, and the series star connection. Here, the minimum operation domain is a domain in which operation is performed at a rotational speed lower than that in the intermediate operation domain. The quasi-rated operation domain is a domain in which operation is performed at a rotational speed between the rated operation domain and the intermediate operation domain.

For the combined efficiency η, it is efficiently preferable that at least one cross-point CP1 be generated between the minimum operation domain and the intermediate domain, and the wiring state be switched at a temperature difference (load) corresponding to a rotational speed lower than or equal to the rotational speed at the cross-point CP1.

Similarly, for the combined efficiency η, it is efficiently preferable that at least one cross-point CP2 be generated between the intermediate domain and the quasi-rated domain, and the wiring state be switched at a temperature difference corresponding to a rotational speed lower than or equal to the rotational speed at the cross-point CP2.

Similarly, for the combined efficiency η, it is efficiently preferable that at least one cross-point CP3 be generated between the quasi-rated domain and the rated domain, and the wiring state be switched at a temperature difference corresponding to the rotational speed at the cross-point CP3.

Note that the rotational speeds at the cross-points CP1, CP2, and CP3 may be experimentally determined in advance, and the wiring state may be controlled on the basis of these rotational speeds. Alternatively, the wiring state may be controlled so that the current value, the temperature, or the like becomes optimum for the product in which the compressor 211 is used. The wiring state may be switched at a rotational speed other than the rotational speeds at the cross-points CP1, CP2, and CP3 in accordance with a factor other than efficiency, such as a limitation on current or optimality of switching control. For reasons such as controllability, hysteresis may be provided at the switching timing of the wiring state.

The wiring switch part 216 illustrated in FIG. 1 switches the wiring state in accordance with the temperature difference between the indoor temperature and the set temperature in response to an instruction from the controller 217.

For example, when the rotational speed is in the minimum operation domain, the wiring state is switched to the series star connection illustrated in FIG. 22A. The series star connection is a connection state having the largest electromotive force.

When the rotational speed is in the intermediate operation domain, the wiring state is switched to the series delta connection illustrated in FIG. 22B. The series delta connection is a connection state having the second-largest electromotive force.

When the rotational speed is in the quasi-rated operation domain, the wiring state is switched to the parallel star connection illustrated in FIG. 22C. The parallel star connection is a connection state having the second smallest electromotive force.

When the rotational speed is in the rated operation domain, the wiring state is switched to the parallel delta connection illustrated in FIG. 22D. The parallel delta connection is a connection state having the smallest electromotive force.

The connection state having the largest electromotive force, as illustrated in FIG. 22A, has a line induced voltage of $\sqrt{3}$ times the voltage of the connection state that is highly efficient in the intermediate operation domain, as illustrated in FIG. 22B. Therefore, high efficiency can be achieved in the minimum operation domain.

The connection state that is highly efficient in the quasi-rated operation domain, as illustrated in FIG. 22C, has a line induced voltage of $\sqrt{3}/2$ times. Therefore, high efficiency can be achieved in the quasi-rated operation domain.

The connection state that is highly efficient in the rated operation domain, as illustrated in FIG. 22D, has a line induced voltage of $1/2$ times. Therefore, high efficiency can be achieved in the quasi-rated operation domain.

Note that, similar to the first embodiment, by shifting the phase of the waveform of the current output from the inverter 115, the peak point of the efficiency in each operation domain can be shifted. Therefore, by shifting the wiring state of the wiring switch part 216, the peak of the efficiency can be significantly shifted, and by shifting the phase of the current waveform, the peak of the efficiency can be changed within a small range.

The operations of the air conditioner 200 according to the second embodiment will now be explained.

Note that the flowchart illustrating the operation of the air conditioner 200 according to the second embodiment for determining the operation mode is the same as that in FIG. 11.

Figure 24:
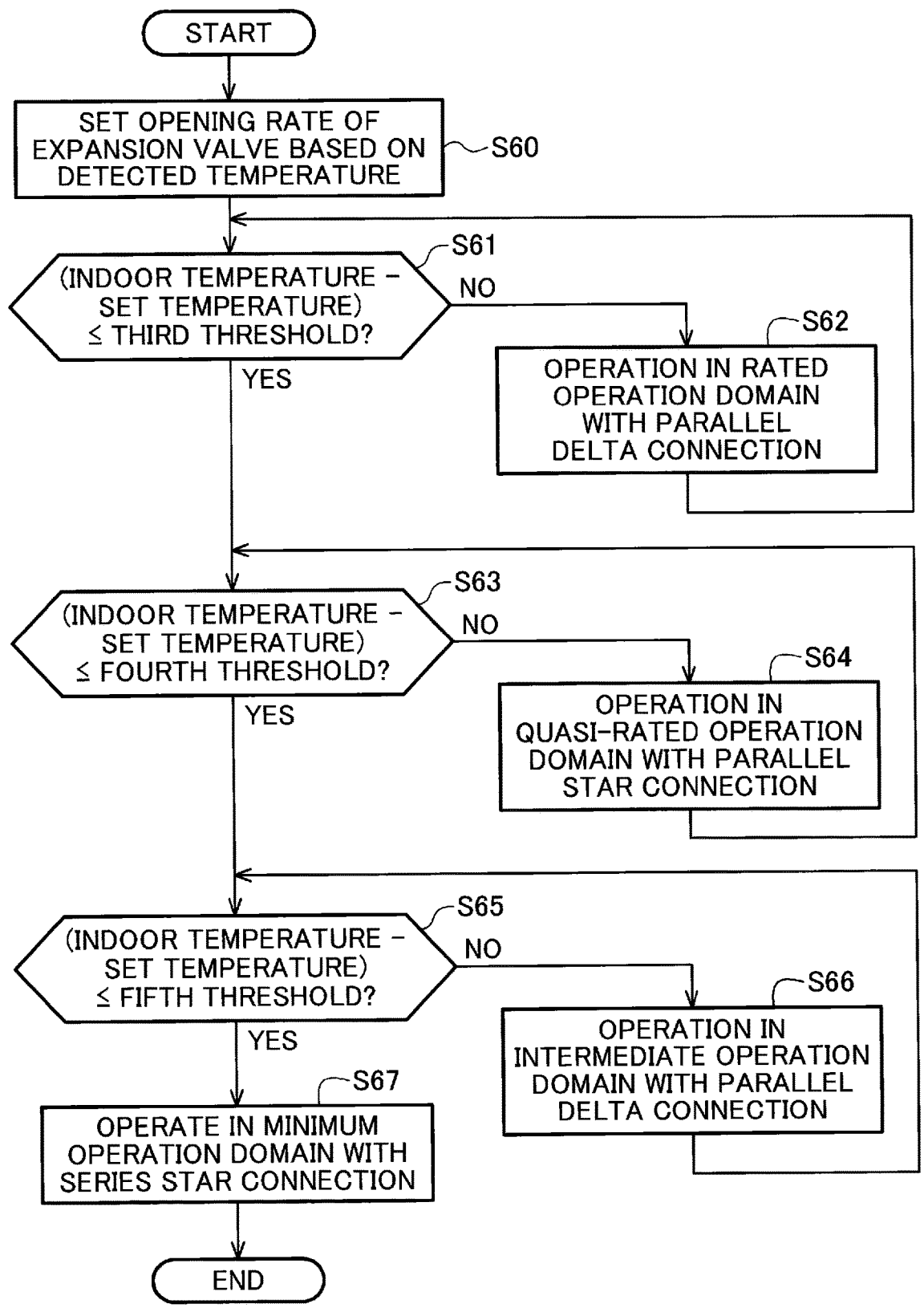
FIG. 24 is a flowchart illustrating an operation of the air conditioner according to the second embodiment in a cooling mode.

FIG. 24 is a flowchart illustrating the operation of the air conditioner 200 according to the second embodiment in the cooling mode.

First, the controller 217 obtains the outdoor heat-exchange intermediate temperature, the indoor heat-exchange intermediate temperature, and the intake temperature respectively from the outdoor-heat-exchange intermediate-temperature detector 118b, the indoor-heat-exchange intermediate-temperature detector 152a, and the intake temperature detector 152b, and sets the opening rate of the expansion valve 114 on the basis of the obtained temperature (step S60).

The controller 217 may obtain the outdoor heat-exchange intermediate temperature, the indoor heat-exchange intermediate temperature, and the intake temperature without operating the air conditioner 200, or obtain the outdoor heat-exchange intermediate temperature, the indoor heat-exchange intermediate temperature, and the intake temperature, for example, after at least one of the indoor fan and the outdoor fan is operated for a predetermined time.

The controller 217 varies the opening rate of the expansion valve 114 set in step S60 in accordance with the subsequent operation state, on the basis of the temperature detected by at least one of the outdoor-heat-exchange intermediate-temperature detector 118b, the indoor-heat-exchange intermediate-temperature detector 152a, and the intake temperature detector 152b.

The controller 217 then determines whether or not the temperature difference between the indoor temperature and the set temperature is smaller than or equal to a predetermined third threshold (S61). If the temperature difference is larger than the third threshold (No in step S61), the process proceeds to step S62. If the temperature difference is smaller than or equal to the third threshold (Yes in step S61), the process proceeds to step S63.

In step S62, because the temperature difference and the cooling load are large, the operation with an increased rotational speed needs to be continued until the temperature difference becomes small. Therefore, the controller 217 instructs the wiring switch part 216 to switch the wiring state to the parallel delta connection and performs the cooling operation in the rated operation domain. After the predetermined time has passed, the process returns to step S61.

In step S63, the controller 217 determines whether or not the temperature difference between the indoor temperature and the set temperature is smaller than or equal to a predetermined fourth threshold. If the temperature difference is larger than the fourth threshold (No in step S63), the process proceeds to step S64. If the temperature difference is smaller than or equal to the fourth threshold (Yes in step S63), the process proceeds to step S65.

In step S64, although the temperature difference and the cooling load are becoming smaller, because the cooling load is still large, an operation with a high rotational speed needs to be continued until the temperature difference becomes small. Therefore, the controller 217 instructs the wiring switch part 216 to switch the wiring state to the parallel star connection and performs the cooling operation in the quasi-rated operation domain. After the predetermined time has passed, the process returns to step S63.

In step S65, the controller 217 determines whether or not the temperature difference between the indoor temperature and the set temperature is smaller than or equal to a predetermined fifth threshold. If the temperature difference is larger than the fifth threshold (No in step S65), the process proceeds to step S66. If the temperature difference is smaller than or equal to the fifth threshold (Yes in step S65), the process proceeds to step S67.

In step S66, although the temperature difference and the cooling load are becoming smaller, because the cooling load is still moderately large, an operation with a moderately high rotational speed needs to be continued until the temperature difference becomes small. Therefore, the controller 217 instructs the wiring switch part 216 to switch the wiring state to the series delta connection and performs the cooling operation in the intermediate operation domain. After the predetermined time has passed, the process returns to step S65.

In step S67, because the temperature difference is becoming small, the cooling load is sufficiently small, and the cooling load is small; an operation with a low rotational speed can be performed. Therefore, the controller 217 instructs the wiring switch part 216 to switch the wiring state to the series star connection and performs the cooling operation in the minimum operation domain.

Note that it is presumed that, in the flowchart in FIG. 24 described above, the following condition is satisfied: third threshold>fourth threshold>fifth threshold.

The third threshold is a threshold for switching the rated operation domain and the quasi-rated operation domain. It is desirable that the third threshold be the temperature difference corresponding to the cross-point CP3 in FIG. 23B.

The fourth threshold is a threshold for switching the quasi-rated operation domain and the intermediate operation domain. It is desirable that the fourth threshold be the temperature difference corresponding to the cross-point CP2 in FIG. 23B.

The fifth threshold is a threshold for switching the rated operation domain and the quasi-rated operation domain. It is desirable that the fifth threshold be the temperature difference corresponding to the cross-point CP1 in FIG. 23B.

Figure 25:
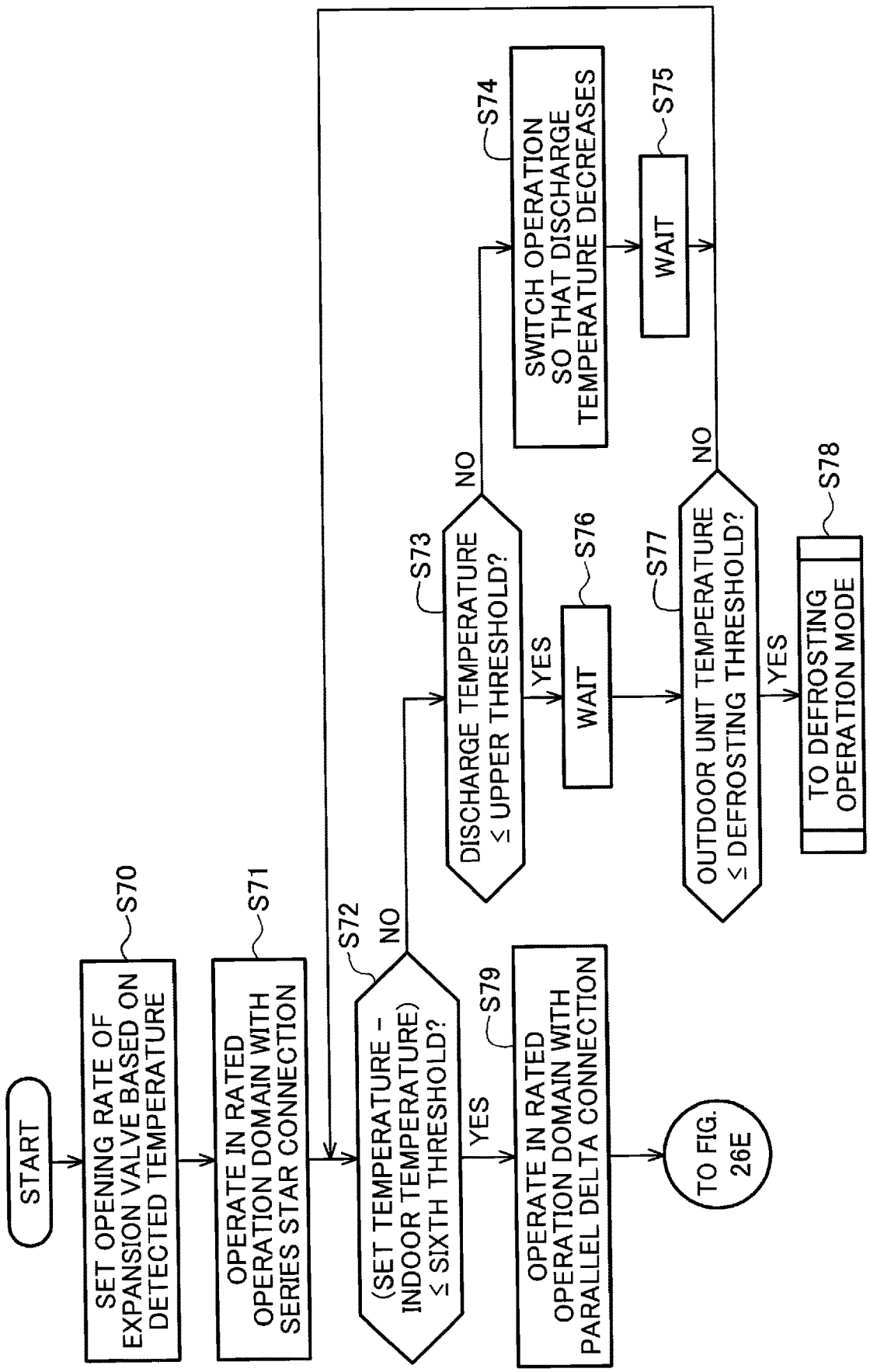
FIG. 25 is a first flowchart illustrating an operation of the air conditioner according to the second embodiment in a heating mode.
Figure 26:
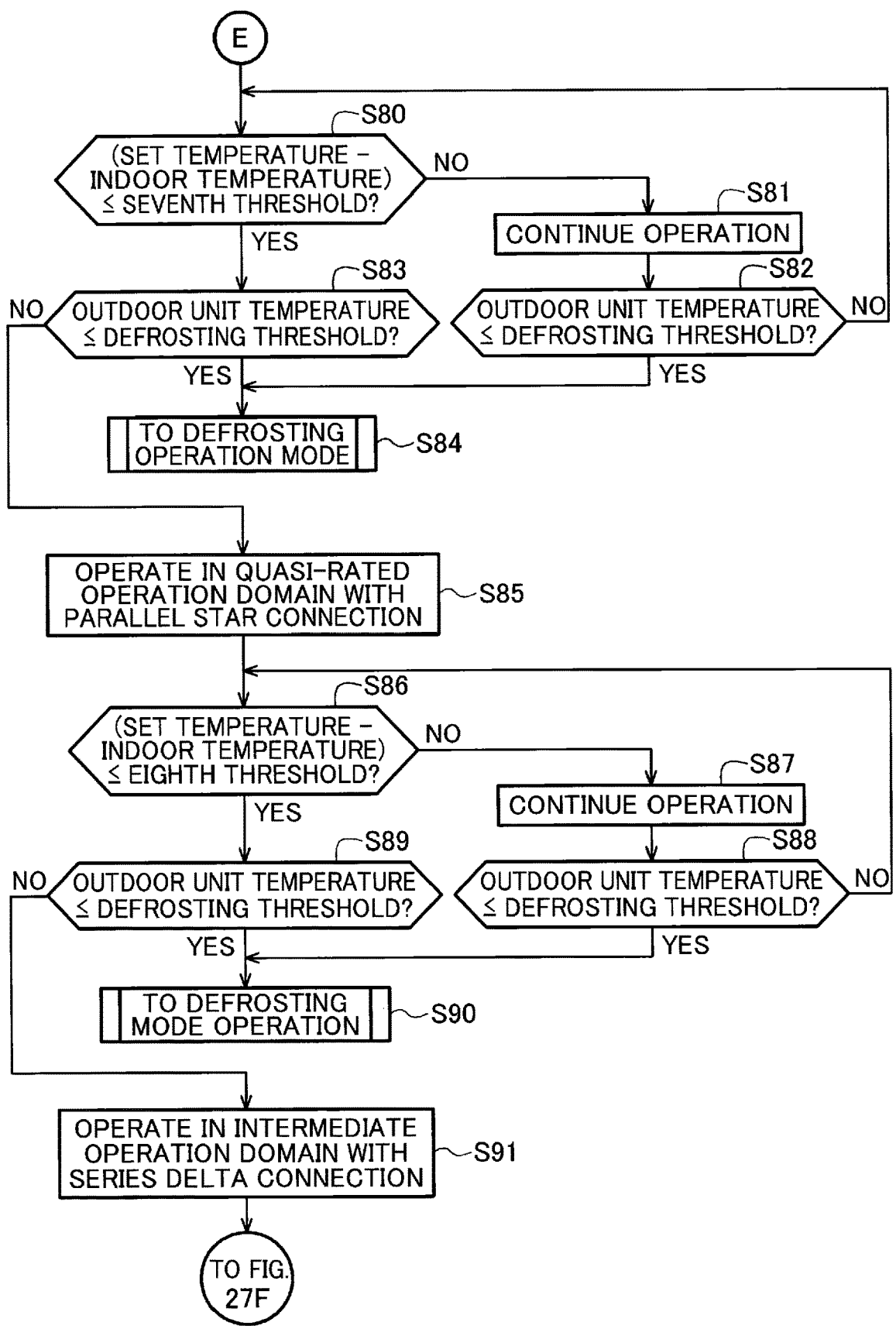
FIG. 26 is a second flowchart illustrating an operation of the air conditioner according to the second embodiment in a heating mode.
Figure 27:
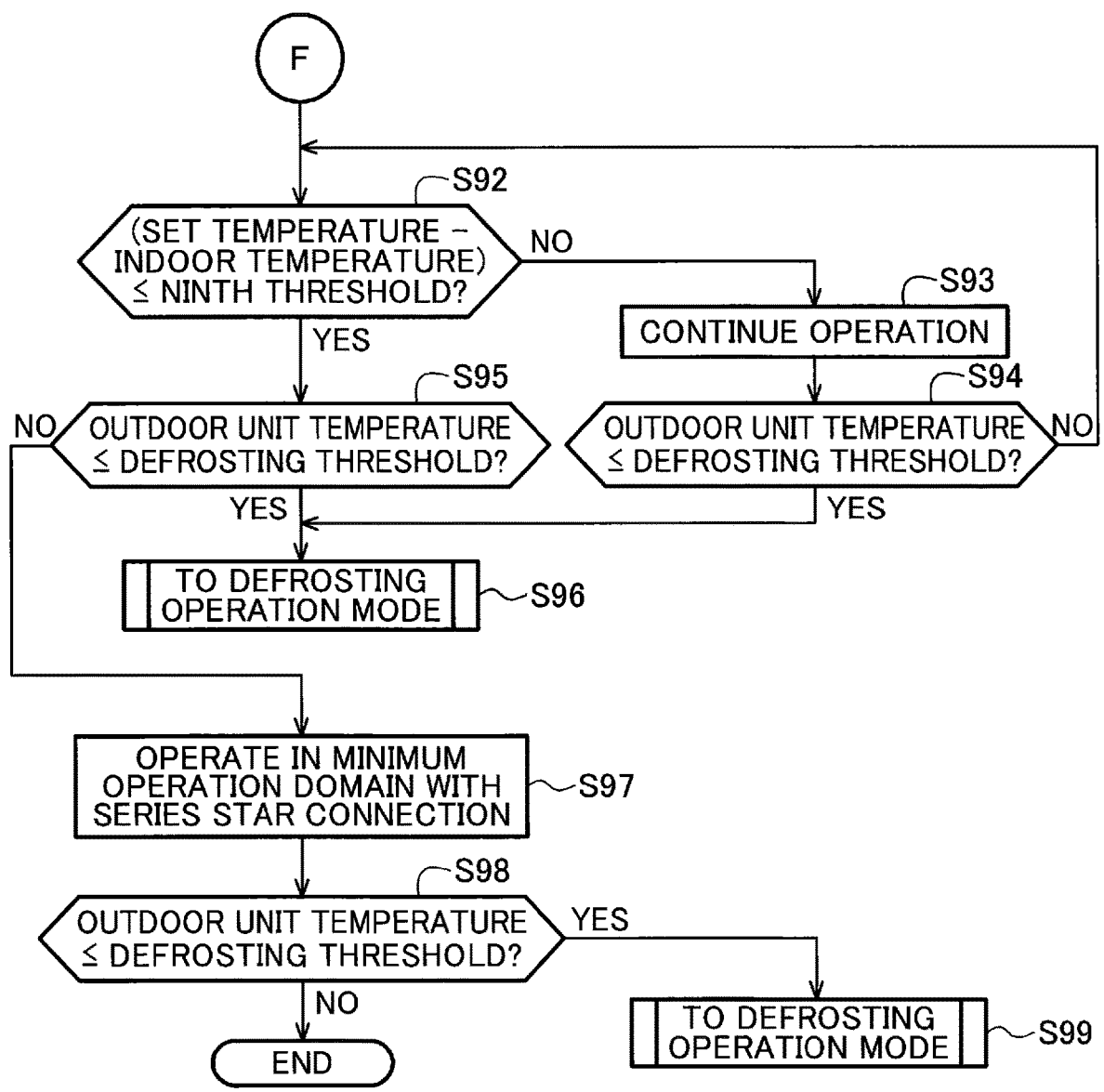
FIG. 27 is a third flowchart illustrating an operation of the air conditioner according to the second embodiment in a heating mode.

FIGS. 25 to 27 are flowcharts illustrating the operation of the air conditioner 200 according to the second embodiment in the heating mode.

First, the controller 217 obtains the outdoor heat-exchange intermediate temperature, the indoor heat-exchange intermediate temperature, and the intake temperature respectively from the outdoor-heat-exchange intermediate-temperature detector 118b, the indoor-heat-exchange intermediate-temperature detector 152a, and the intake temperature detector 152b, and sets the opening rate of the expansion valve 114 on the basis of the obtained temperature (step S70).

The controller 217 may obtain the outdoor heat-exchange intermediate temperature, the indoor heat-exchange intermediate temperature, and the intake temperature without operating the air conditioner 200, or obtain the outdoor heat-exchange intermediate temperature, the indoor heat-exchange intermediate temperature, and the intake temperature, for example, after at least one of the indoor fan and the outdoor fan is operated for a predetermined time.

The controller 217 varies the opening rate of the expansion valve 114 set in step S70 in accordance with the subsequent operation state, on the basis of the temperature detected by at least one of the outdoor-heat-exchange intermediate-temperature detector 118b, the indoor-heat-exchange intermediate-temperature detector 152a, and the intake temperature detector 152b.

The controller 217 then instructs the wiring switch part 216 to switch the wiring state to the series star connection and starts the heating operation (step S71). Here, the controller 217 uses the series star connection, which has low motor efficiency and the largest electromotive force, so as to heat the refrigerant with the heat generated by the motor 221. In this way, the indoor temperature can be quickly raised.

The controller 217 then determines whether or not the temperature difference between the set temperature and the indoor temperature is smaller than or equal to a predetermined sixth threshold (S72). If the temperature difference is larger than the predetermined sixth threshold (No in step S72), the process proceeds to step S73. If the temperature difference is smaller than or equal to the predetermined sixth threshold (Yes in step S72), the process proceeds to step S79.

In step S73, the controller 217 determines whether or not the discharge temperature detected by the discharge temperature detector 118a is lower than or equal to a predetermined upper threshold. If the discharge temperature is higher than the upper threshold (No in step S73), the process proceeds to step S74. If the discharge temperature is lower than or equal to the upper threshold (Yes in step S73), the process proceeds to step S76.

On the other hand, since the discharge temperature is higher than a heat resisting temperature as a result of excessive impairment of the efficiency, the controller 217 takes measures to lower the discharge temperature in step S74. Here, the controller 217 instructs the wiring switch part 216 to switch the current wiring state to a wiring state having efficiency one level higher than the efficiency of the current wiring state. For example, if the current wiring state is the series star connection, the controller 217 switches the wiring state to the series delta connection.

The controller 217 then waits for a predetermined time (step S75) and causes the process to return to step S72.

In step S76, the controller 217 waits for a predetermined time and causes the process to proceed to step S77.

In step S77, the controller 217 determines whether or not the outdoor unit temperature is lower than or equal to a predetermined defrosting threshold. If the outdoor unit temperature is lower than or equal to the defrosting threshold (Yes in step S77), the process proceeds to step S78. If the outdoor unit temperature is higher than the defrosting threshold (No in step S77), the process returns to step S72.

In step S78, the controller 217 operates the air conditioner 200 in the defrosting operation mode. This process will be explained below in detail with reference to FIG. 28.

Since the temperature difference between the set temperature and the indoor temperature is becoming small, the controller 217 instructs the wiring switch part 216 to switch the wiring state to the parallel delta connection and performs the heating operation in the rated operation domain in step S79 so as to perform an efficient operation. The process then proceeds to step S80 in FIG. 26.

In step S80, the controller 217 determines whether or not the temperature difference between the set temperature and the indoor temperature is smaller than or equal to a seventh threshold. If the temperature difference is larger than the seventh threshold (No in step S80), the process proceeds to step S81. If the temperature difference is smaller than or equal to the seventh threshold (Yes in step S80), the process proceeds to step S83.

In step S81, the controller 217 waits for a predetermined time and causes the process to proceed to step S82.

In step S82, the controller 217 determines whether or not the outdoor unit temperature is lower than or equal to the defrosting threshold. If the outdoor unit temperature is higher than the defrosting threshold (No in step S82), the process returns to step S80. If the outdoor unit temperature is lower than or equal to the defrosting threshold (Yes in step S82), the process proceeds to step S84.

In step S83, the controller 217 determines whether or not the outdoor unit temperature is lower than or equal to the defrosting threshold. If the outdoor unit temperature is higher than the defrosting threshold (No in step S83), the process proceeds to step S85. If the outdoor unit temperature is lower than or equal to the defrosting threshold (Yes in step S83), the process proceeds to step S84.

In step S84, the controller 217 operates the air conditioner 200 in the defrosting operation mode. This process will be explained below in detail with reference to FIG. 28.

Since the temperature difference is becoming small, the controller 217 instructs the wiring switch part 216 to switch the wiring state to the parallel star connection and performs the heating operation in the quasi-rated operation domain in step S85 so as to perform a more efficient operation. The process then proceeds to step S86.

In step S86, the controller 217 determines whether or not the temperature difference between the set temperature and the indoor temperature is smaller than or equal to an eighth threshold. If the temperature difference is larger than the eighth threshold (No in step S86), the process proceeds to step S87. If the temperature difference is smaller than or equal to the eighth threshold (Yes in step S86), the process proceeds to step S89.

In step S87, the controller 217 waits for a predetermined time and causes the process to proceed to step S88.

In step S88, the controller 217 determines whether or not the outdoor unit temperature is lower than or equal to the defrosting threshold. If the outdoor unit temperature is higher than the defrosting threshold (No in step S88), the process returns to step S86. If the outdoor unit temperature is lower than or equal to the defrosting threshold (Yes in step S88), the process proceeds to step S90.

In step S89, the controller 217 determines whether or not the outdoor unit temperature is lower than or equal to the defrosting threshold. If the outdoor unit temperature is higher than the defrosting threshold (No in step S89), the process proceeds to step S91. If the outdoor unit temperature is lower than or equal to the defrosting threshold (Yes in step S89), the process proceeds to step S90.

In step S90, the controller 217 operates the air conditioner 200 in the defrosting operation mode. This process will be explained below in detail with reference to FIG. 28.

Since the temperature difference is becoming small, the controller 217 instructs the wiring switch part 216 to switch the wiring state to the series delta connection and performs the heating operation in the intermediate operation domain in step S91 so as to perform a more efficient operation. The process then proceeds to step S92 in FIG. 27.

In step S92, the controller 217 determines whether or not the temperature difference between the set temperature and the indoor temperature is smaller than or equal to a ninth threshold. If the temperature difference is larger than the ninth threshold (No in step S92), the process proceeds to step S93. If the temperature difference is smaller than or equal to the ninth threshold (Yes in step S92), the process proceeds to step S95.

In step S93, the controller 217 waits for a predetermined time and causes the process to proceed to step S94.

In step S94, the controller 217 determines whether or not the outdoor unit temperature is lower than or equal to the defrosting threshold. If the outdoor unit temperature is higher than the defrosting threshold (No in step S94), the process returns to step S92. If the outdoor unit temperature is lower than or equal to the defrosting threshold (Yes in step S94), the process proceeds to step S96.

In step S95, the controller 217 determines whether or not the outdoor unit temperature is lower than or equal to the defrosting threshold. If the outdoor unit temperature is higher than the defrosting threshold (No in step S95), the process proceeds to step S97. If the outdoor unit temperature is lower than or equal to the defrosting threshold (Yes in step S95), the process proceeds to step S96.

In step S96, the controller 217 operates the air conditioner 200 in the defrosting operation mode. This process will be explained below in detail with reference to FIG. 28.

Since the temperature difference is becoming small, the controller 217 instructs the wiring switch part 216 to switch the wiring state to the series star connection and performs the heating operation in the minimum operation domain in step S97 so as to perform a more efficient operation.

The controller 217 then determines whether or not the outdoor unit temperature is lower than or equal to the defrosting threshold (step S98). If the outdoor unit temperature is higher than the defrosting threshold (Yes in step S98), the process proceeds to step S99.

In step S99, the controller 217 operates the air conditioner 200 in the defrosting operation mode. This process will be explained below in detail with reference to FIG. 28.

Note that it is presumed that, in the flowcharts in FIGS. 25 to 27 described above, the following condition is satisfied: sixth threshold>seventh threshold>eighth threshold>ninth threshold.

The seventh threshold is a threshold for switching the rated operation domain and the quasi-rated operation domain. It is desirable that the seventh threshold be the temperature difference corresponding to the cross-point CP3 in FIG. 23B.

The eighth threshold is a threshold for switching the quasi-rated operation domain and the intermediate operation domain. It is desirable that the eighth threshold be the temperature difference corresponding to the cross-point CP2 in FIG. 23B.

The ninth threshold is a threshold for switching the rated operation domain and the quasi-rated operation domain. It is desirable that the ninth threshold be the temperature difference corresponding to the cross-point CP1 in FIG. 23B.

Figure 28:
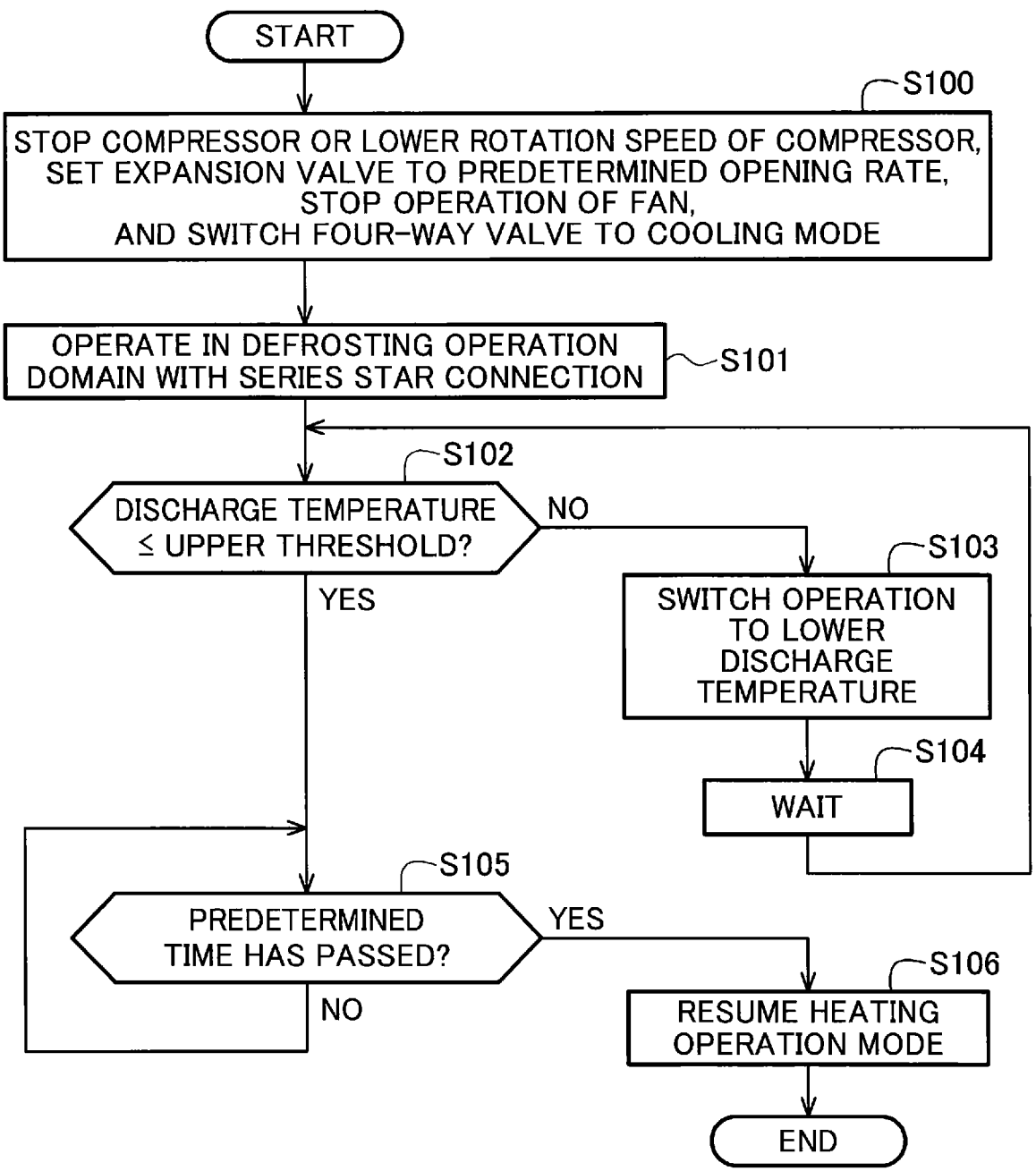
FIG. 28 is a flowchart illustrating an operation of the air conditioner according to the second embodiment in a defrosting operation mode.

FIG. 28 is a flowchart illustrating the operation of the air conditioner 200 according to the second embodiment in the defrosting operation mode.

First, in order to switch the operation mode, the controller 217 stops the compressor 211 or lowers the rotational speed of the compressor 211, sets the expansion valve 114 to a predetermined opening rate, stops the operation of the indoor fan and the outdoor fan, and switches the four-way valve 112 to the cooling mode (step S100).

The controller 217 then instructs the wiring switch part 216 to switch the wiring state to the series star connection and starts the defrosting operation in the defrosting operation domain (step S101).

The controller 217 then determines whether or not the discharge temperature detected by the discharge temperature detector 118a is lower than or equal to a predetermined upper threshold (step S102). If the discharge temperature is higher than the upper threshold (No in step S102), the process proceeds to step S103. If the discharge temperature is lower than or equal to the upper threshold (Yes in step S102), the process proceeds to step S105.

Since the discharge temperature is higher than a heat resisting temperature as a result of excessive impairment of the efficiency, the controller 217 takes measures to lower the discharge temperature in step S103. Here, the controller 217 instructs the wiring switch part 216 to switch the current wiring state to a wiring state having efficiency one level higher than the efficiency of the current wiring state. For example, if the current wiring state is the series star connection, the controller 217 switches the wiring state to the series delta connection.

The controller 217 then waits for a predetermined time (step S104) and causes the process to return to step S102.

The controller 217 then determines whether or not the operation in the defrosting operation mode has been continued for a predetermined time (step S105). If the operation in the defrosting operation mode has not been continued for a predetermined time (No in step S105), the process returns to step S105. If the defrosting operation has been continued for a predetermined time (Yes in step S105), the process proceeds to step S106.

In step S106, the controller 217 switches the operation mode from the defrosting operation mode to the heating operation mode. For example, if the temperature difference between the indoor temperature and the set temperature is larger than the sixth threshold, the controller 217 causes the process to return to step S71 in FIG. 25. If the temperature difference is smaller than or equal to the sixth threshold and larger than the seventh threshold, the controller 217 causes the process to return to step S79 in FIG. 25. If the temperature difference is smaller than or equal to the seventh threshold and larger than the eighth threshold, the controller 217 causes the process to return to step S85 in FIG. 26. If the temperature difference is smaller than or equal to the eighth threshold and larger than the ninth threshold, the controller 217 causes the process to return to step S91 in FIG. 25. If the temperature difference is smaller than or equal to the ninth threshold, the controller 217 causes the process to return to step S97 in FIG. 27.

Note that, in step S105 in FIG. 28, the controller 217 determines whether or not a predetermined time has passed. However, in the case where the outdoor heat exchanger 113, which is the object to be defrosted, includes a temperature detector, the controller 217 may switch the operation mode to the heating operation mode when the temperature detected by the temperature detector reaches or exceeds a defrosting complete threshold, which is a predetermined temperature.

As explained in the second embodiment above, the parallel delta connection, the parallel star connection, the series delta connection, and the series star connection can be switched to improve the APF.

Note that, in the flowcharts of the heating mode in FIGS. 25 to 27, after the opening rate of the expansion valve 114 has been set in step S70, the wiring state is switched to the series star connection, and the heating operation is started in step S71. However, the second embodiment is not limited to such an example.

For example, FIGS. 29 to 32 are flowcharts illustrating a modified example of the operation of the air conditioner 200 according to the second embodiment in the heating mode.

Figure 29:
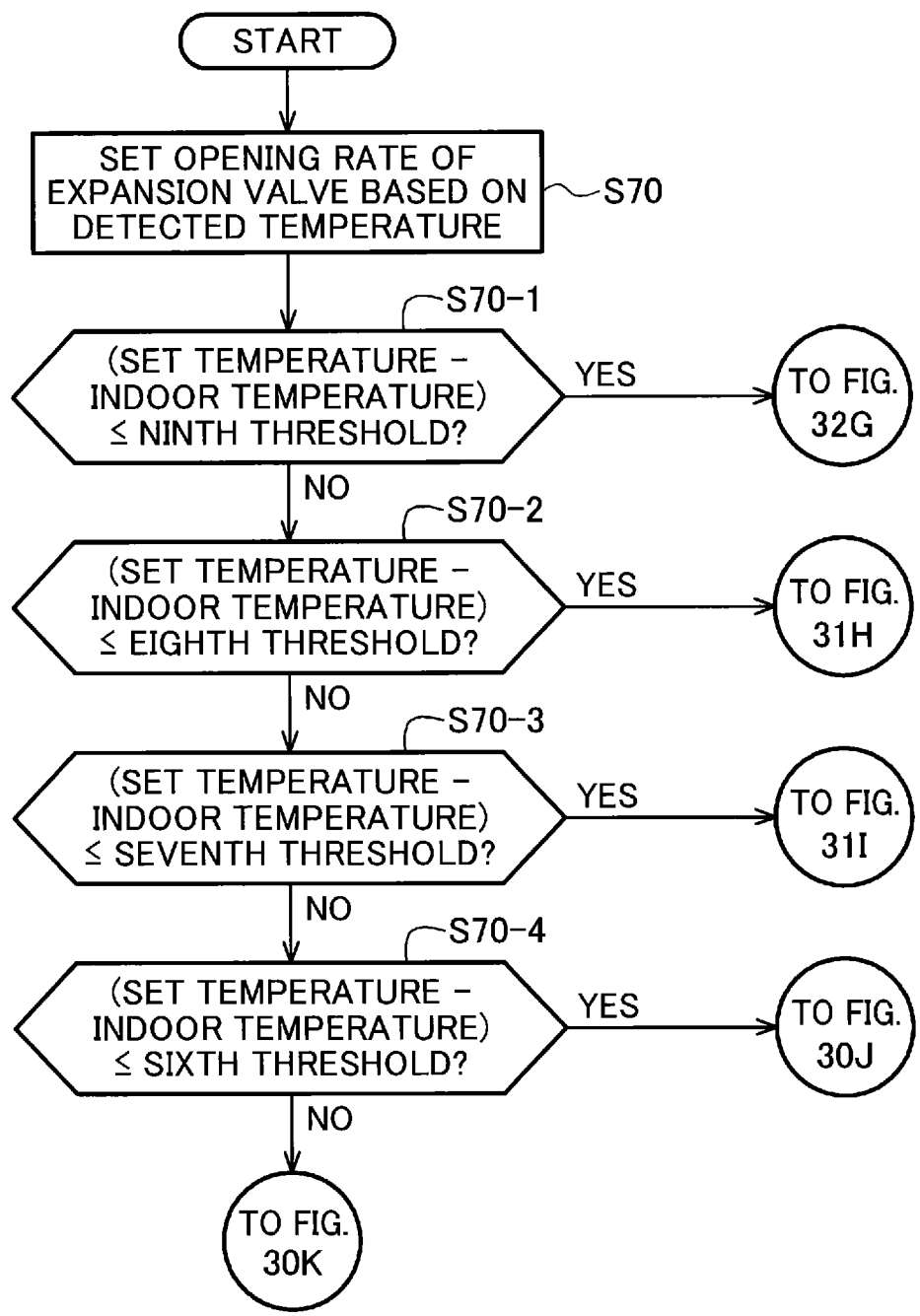
FIG. 29 is a first flowchart illustrating a modified example of an operation of the air conditioner according to the second embodiment in a heating mode.
Figure 30:
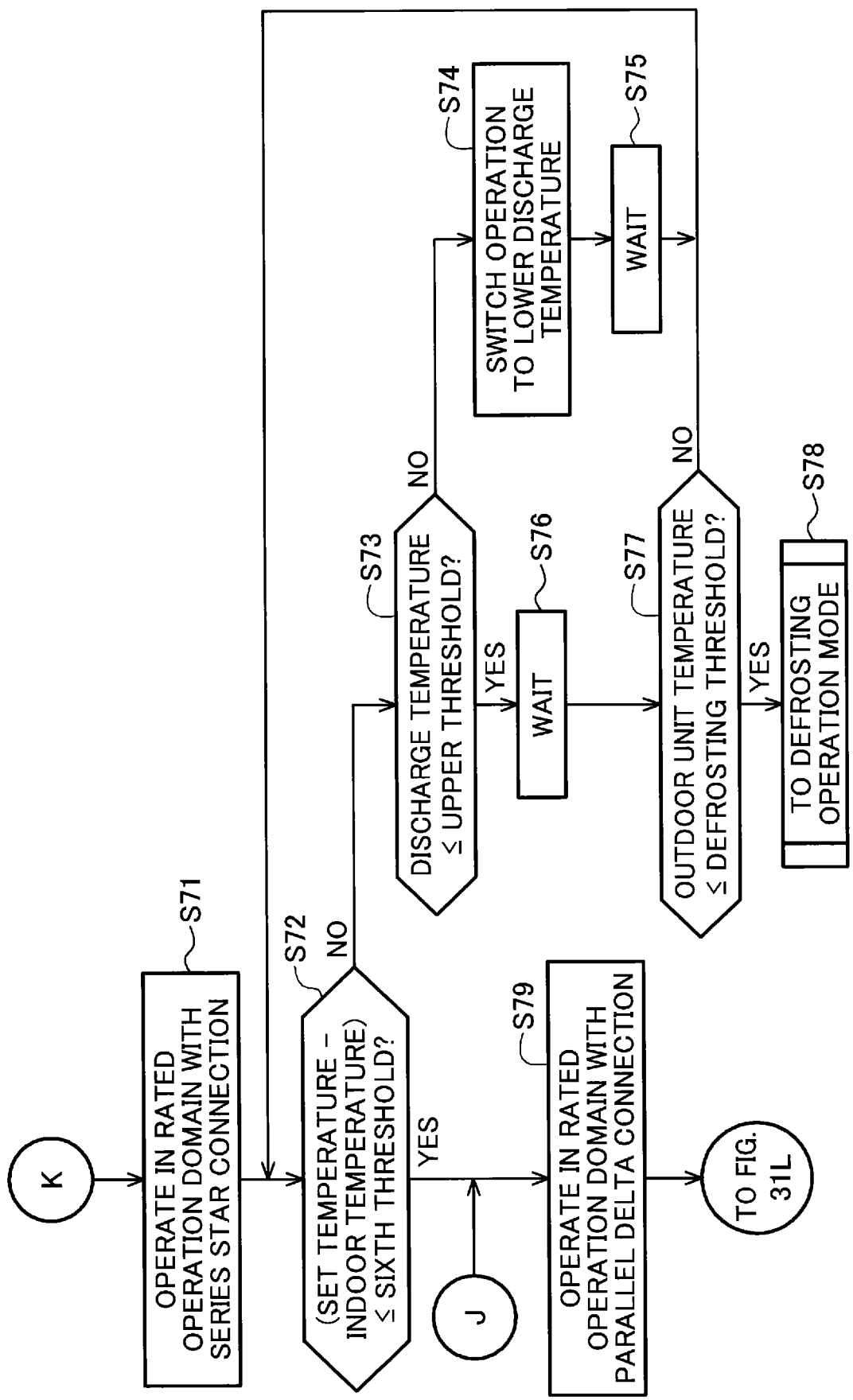
FIG. 30 is a second flowchart illustrating a modified example of an operation of the air conditioner according to the second embodiment in a heating mode.
Figure 31:
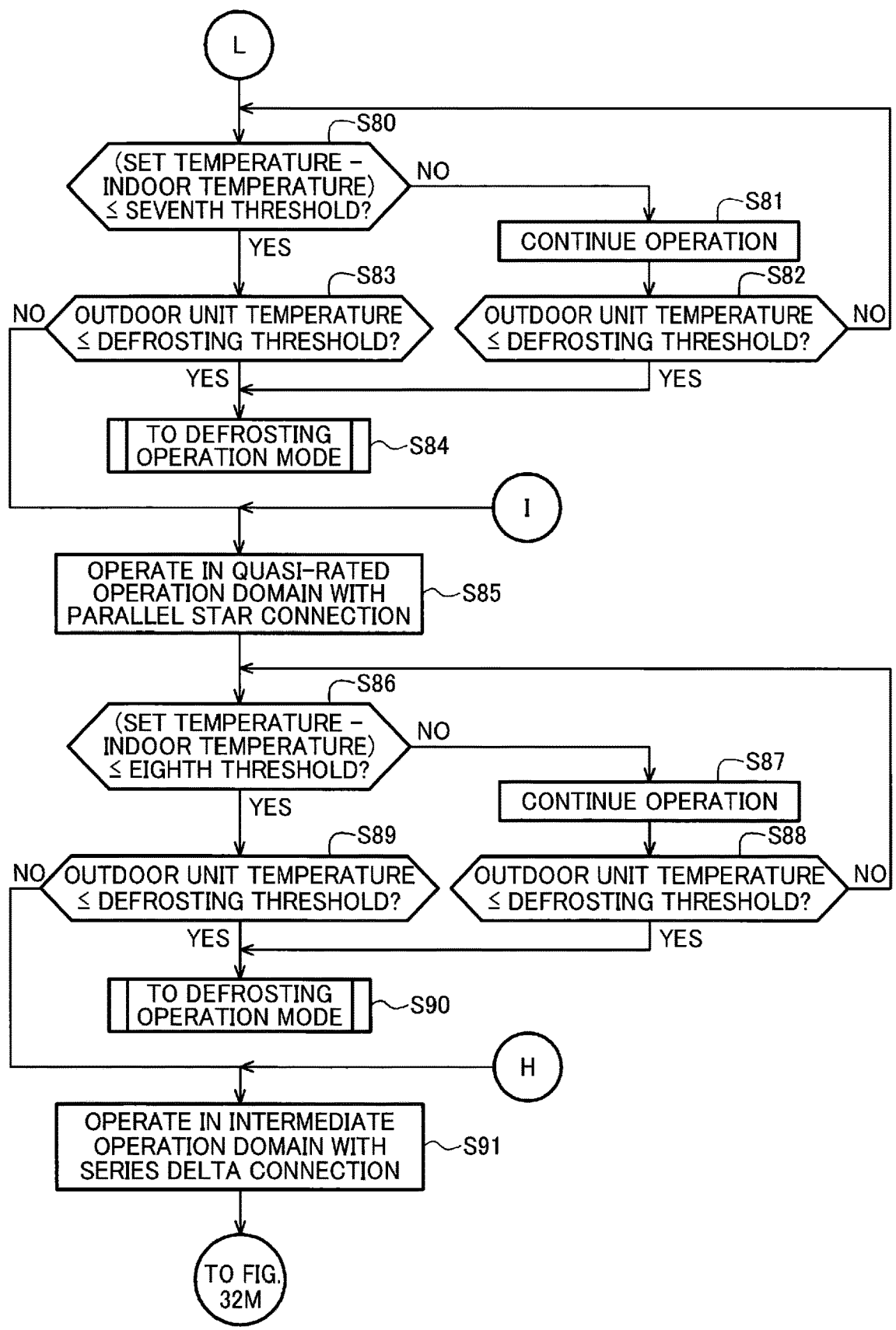
FIG. 31 is a third flowchart illustrating a modified example of an operation of the air conditioner according to the second embodiment in a heating mode.
Figure 32:
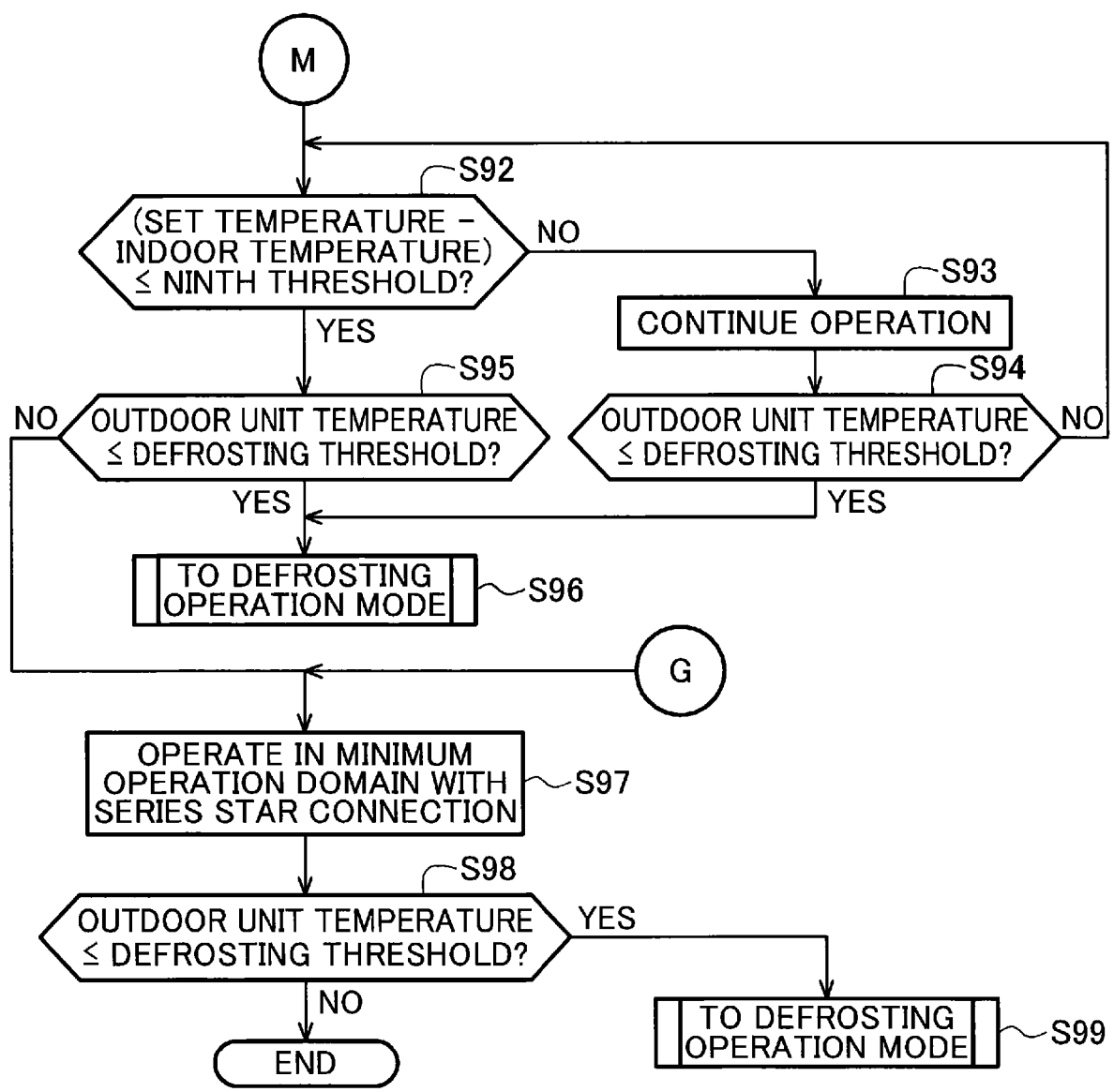
FIG. 32 is a fourth flowchart illustrating a modified example of an operation of the air conditioner according to the second embodiment in a heating mode.

As illustrated in FIGS. 29 and 30, in this modified example, compared with the flowchart in FIG. 25, steps S70-1 and S70-4 are inserted between steps S70 and S71 for switching the wiring state at the start of the heating operation in accordance with the temperature difference between the set temperature and the indoor temperature.

In step S70-1, the controller 217 determines whether or not the temperature difference between the set temperature and the indoor temperature is smaller than or equal to a predetermined ninth threshold. If the temperature difference is larger than a predetermined ninth threshold (No in step S70-1), the process proceeds to step S70-2. If the temperature difference is smaller than or equal to the predetermined ninth threshold (Yes in step S70-1), the process proceeds to step S97 in FIG. 32. In step S97, the controller 217 instructs the wiring switch part 216 to switch the wiring state to the series star connection and starts the heating operation.

In step S70-2, the controller 217 determines whether or not the temperature difference between the set temperature and the indoor temperature is smaller than or equal to a predetermined eighth threshold. If the temperature difference is larger than the predetermined eighth threshold (No in step S70-2), the process proceeds to step S70-3. If the temperature difference is smaller than or equal to the predetermined eighth threshold (Yes in step S70-2), the process proceeds to step S91 in FIG. 31. In step S91, the controller 217 instructs the wiring switch part 216 to switch the wiring state to the series delta connection and starts the heating operation.

In step S70-3, the controller 217 determines whether or not the temperature difference between the set temperature and the indoor temperature is smaller than or equal to a predetermined seventh threshold. If the temperature difference is larger than the predetermined seventh threshold (No in step S70-3), the process proceeds to step S70-4. If the temperature difference is smaller than or equal to the predetermined seventh threshold (Yes in step S70-3), the process proceeds to step S85 in FIG. 31. In step S85, the controller 217 instructs the wiring switch part 216 to switch the wiring state to the parallel star connection and starts the heating operation.

In step S70-4, the controller 217 determines whether or not the temperature difference between the set temperature and the indoor temperature is smaller than or equal to a predetermined sixth threshold. If the temperature difference is larger than the predetermined sixth threshold (No in step S70-4), the process proceeds to step S71 in FIG. 30. In step S71, the controller 217 instructs the wiring switch part 216 to switch the wiring state to the series star connection and starts the heating operation. If the temperature difference is smaller than or equal to the predetermined sixth threshold (Yes in step S70-4), the process proceeds to step S79 in FIG. 30. In step S79, the controller 217 instructs the wiring switch part 216 to switch the wiring state to the parallel delta connection and starts the heating operation.

According to the modified exampled illustrated FIGS. 29 to 32, the heating operation can be started in the optimum wiring state in accordance with the temperature difference between the set temperature and the indoor temperature. Even in this case, when the temperature difference between the set temperature and the indoor temperature is significantly large and there is a desire to quickly raise the indoor temperature, the series star connection having low efficiency can be deliberately used to heat the refrigerant with the heat generated by the motor 221.

In the flowcharts of the heating mode illustrated in FIGS. 25 to 27 according to the second embodiment, after the opening rate of the expansion valve 114 has been set in step S70, the wiring state is switched to the series star connection and the heating operation is started in step S71. However, the second embodiment is not limited to such an example. For example, the controller 217 uses a wiring state other than the parallel delta connection, which is the wiring state having the highest efficiency in the rated domain, at the start of the heating operation. In this way, more heat can be generated than that generated when the parallel delta connection is used. Therefore, the controller 217 can use a wiring state other than the parallel delta connection and start the heating operation.

In the first and second embodiments, the operation modes of the air conditioners 100, 200 are the cooling operation mode, the heating operation mode, and the defrosting operation mode. However, the operation modes of the first and second embodiments are not limited to those operation modes. For example, the air conditioners 100, 200 may have a heat-application operation mode in which the refrigerant accumulated in the compressors 111, 211 is heated and discharged from the compressors 111, 211.

In the heat-application operation mode, the controllers 117, 217 instructs the inverter 115 to feed DC current or RF current unfollowable by the motors 121, 221. In this way, heat can be applied without rotationally driving the motors 121, 221. The refrigerant heated in this way is vaporized and discharged from the compressor 111, 211.

In the heat-application operation mode, the rotational speed of the motors 121, 221 is zero. Thus, when the efficiency is impaired to raise the temperature, the time until discharge of the refrigerant from the compressors 111, 211 can be reduced by switching to a wiring state having a smaller electromotive force, such as the delta connection in the first embodiment or the parallel delta connection in the second embodiment.

Figure 33:
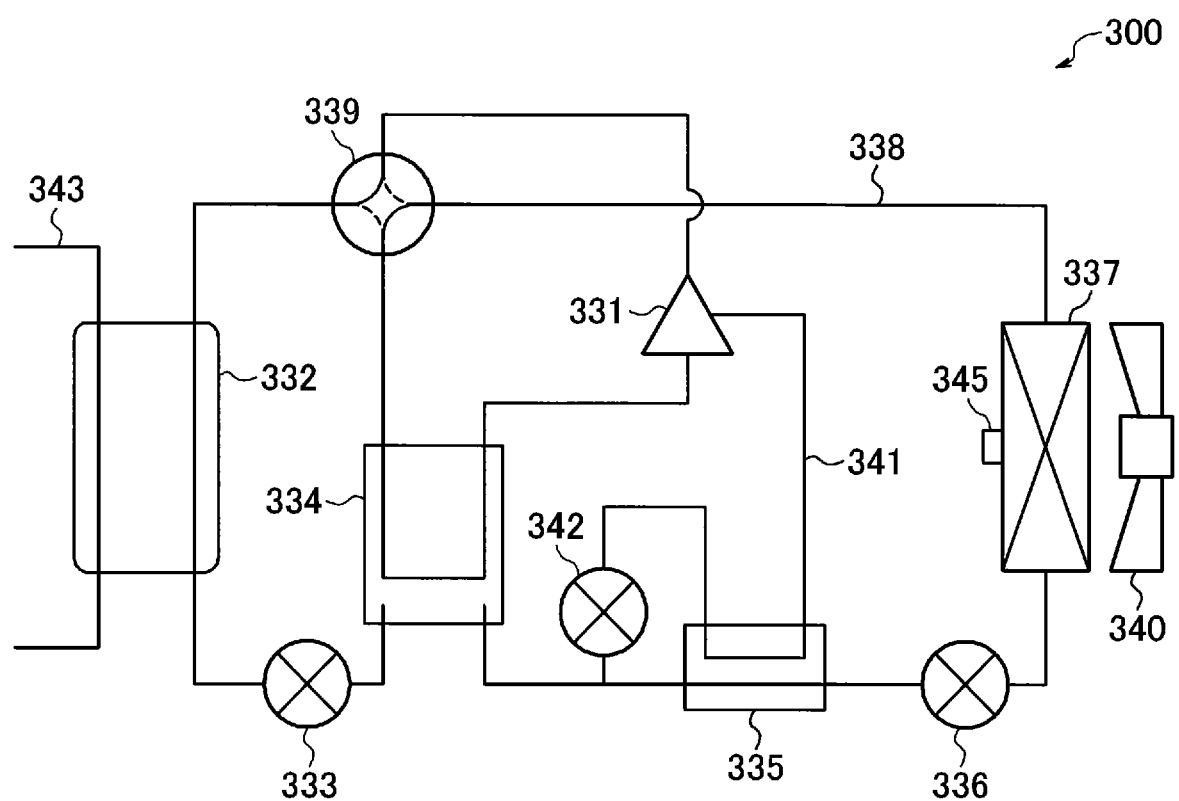
FIG. 33 is a refrigerant circuit diagram schematically illustrating the configuration of a heat pump device that is a modified example of the refrigerating cycle device according to any one of the first and second embodiments.

In the first and second embodiments, the air conditioners 100, 200 have been described as examples of a refrigerating cycle device. However, the refrigerating cycle devices according to the first and second embodiments are not limited to the air conditioners 100, 200. For example, the refrigerating cycle device according to any one of the first and second embodiments may be a heat pump device 300, as illustrated in FIG. 33.

The heat pump device 300 has a main refrigerant circuit 338 that includes a compressor 331, a heat exchanger 332, an expansion valve 333, a receiver 334, an internal heat exchanger 335, an expansion valve 336, and a heat exchanger 337, which are sequentially coupled by piping to circulate a refrigerant. Note that in the main refrigerant circuit 338, a four-way valve 339 is disposed on the discharge side of the compressor 331 for switching the circulation direction of the refrigerant. Furthermore, a fan 340 is disposed near the heat exchanger 337.

The heat pump device 300 includes an injection circuit 341 that couples, by piping, a section between the receiver 334 and the internal heat exchanger 335 to an injection pipe of the compressor 331. In the injection circuit 341, an expansion valve 342 and the internal heat exchanger 335 are sequentially coupled.

Furthermore, the heat exchanger 332 is coupled to a water circuit 343 through which water circulates. Note that the water circuit 343 is coupled to a device that uses water, such as a water heater, a radiator, or a heat-radiating device of a floor heating system or the like.

Here, the compressor 331 is the compressor 111 or 211 described above in the first or second embodiment. The compressor 331 includes a compression mechanism 120, and a motor 121 or 221 driven by an inverter 115.

Although not illustrated in FIG. 33, the wiring state of the motor 121 or 221 of the compressor 111 or 211 is switched by a wiring switch part 116 or 216 in accordance with an instruction from a controller 117 or 217.

Note that, when the heat pump device 300 is used as a water heater, the set temperature according to the first or second embodiment is the temperature of the supplied hot water, and the indoor temperature according to the first or second embodiment is the temperature of the water before heating in the water circuit 343. Although not illustrated, the temperature of the water before heating by the water circuit 343 may be detected by a water-temperature detector for detecting the temperature of such water.

The outdoor unit temperature according to the first or second embodiment may be a temperature detected by an inter-heat-exchange temperature detector 345 for detecting the temperature of the refrigerant during heat exchange at the heat exchanger 337.

The operation of the heat pump device 300 during a heating operation will now be explained. During the heating operation, the four-way valve 339 is set so that the refrigerant can flow in the direction indicated by the solid lines. Note that the heating operation refers to not only heating by air conditioning but also hot-water supply in which hot water is generated by applying heat to water.

Figure 34:
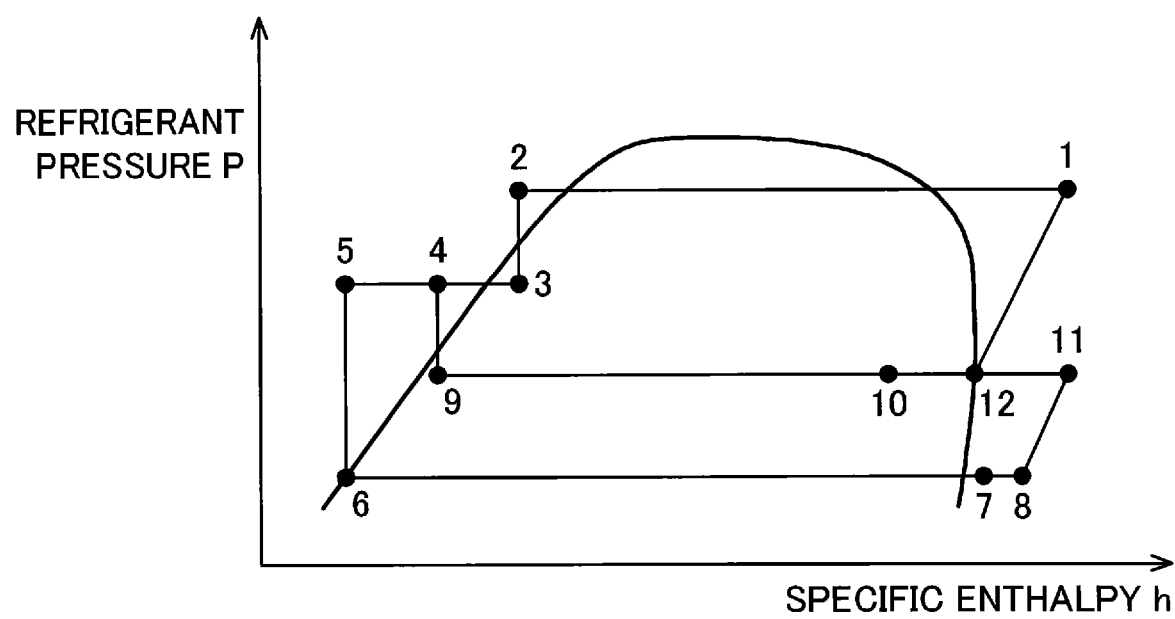
FIG. 34 is a pressure-specific enthalpy chart of the state of a refrigerant of a heat pump device.

FIG. 34 is a p-h chart of the state of the refrigerant in the heat pump device 300 illustrated in FIG. 33. In FIG. 34, the horizontal axis represents specific enthalpy, and the vertical axis represents refrigerant pressure.

A gas-phase refrigerant that has entered a high-temperature, high-pressure state (point 1 in FIG. 34) at the compressor 331 is discharged from the compressor 331. The refrigerant is then subjected to heat exchange and liquified (point 2 in FIG. 34) at the heat exchanger 332 functioning as a condenser and a heat-radiator. At this time, the water circulating through the water circuit 343 is heated by the heat radiated from the refrigerant and is used for heating or hot water supply.

The liquid-phase refrigerant liquefied at the heat exchanger 332 is depressurized into a gas-liquid two-phase state (point 3 in FIG. 34) at the expansion valve 333. The refrigerant that has enter a gas-liquid two-phase state at the expansion valve 333 exchanges heat, at the receiver 334, with the refrigerant sucked into the compressor 331. Through the heat exchange, the refrigerant is cooled and liquefied (point 4 in FIG. 34). The liquid-phase refrigerant liquefied at the receiver 334 branches and flows into the main refrigerant circuit 338 and the injection circuit 341.

The liquid-phase refrigerant flowing through the main refrigerant circuit 338 exchanges heat, at the internal heat exchanger 335, with the refrigerant flowing through the injection circuit 341 in a gas-liquid two-phase state after the depressurization of the expansion valve 342, and is further cooled (point 5 in FIG. 34). The liquid-phase refrigerant cooled at the internal heat exchanger 335 is depressurized into a gas-liquid two-phase state at the expansion valve 336 (point 6 in FIG. 34). The refrigerant that has entered a gas-liquid two-phase state at the expansion valve 336 exchanges heat with external air at the heat exchanger 337 functioning as an evaporator, and is heated (point 7 in FIG. 34). The refrigerant heated at the heat exchanger 337 is further heated at the receiver 334 (point 8 in FIG. 34) and is sucked into the compressor 331.

On the other hand, the refrigerant flowing through the injection circuit 341 is depressurized (point 9 in FIG. 34) at the expansion valve 342, as explained above, and is subjected to heat exchange (point 10 in FIG. 34) at the internal heat exchanger 335. The refrigerant (injection refrigerant) that has entered a gas-liquid two-phase state after being subjected to heat exchange at the internal heat exchanger 335 maintains the gas-liquid two-phase state and flows into the compressor 331 through an injection pipe of the compressor 331.

At the compressor 331, the refrigerant sucked in from the main refrigerant circuit 338 (point 8 in FIG. 34) is compressed and heated to an intermediate pressure (point 11 in FIG. 34). The refrigerant that has been compressed and heated to an intermediate pressure (point 11 in FIG. 34) merges with the injection refrigerant (point 10 in FIG. 34) and undergoes a temperature drop (point 12 in FIG. 34). The refrigerant that undergoes the temperature drop (point 12 in FIG. 34) is further compressed and heated to a high-temperature, high-pressure state, and discharged (point 1 in FIG. 34).

Note that, when the injection operation is not to be performed, the opening rate of the expansion valve 342 is fully closed. That is, when the injection operation is to be performed, the opening rate of the expansion valve 342 is larger than a predetermined opening rate, whereas, when the injection operation is not to be performed, the opening rate of the expansion valve 342 is reduced to an opening rate smaller than the predetermined opening rate. In this way, the refrigerant does not flow into the injection pipe of the compressor 331.

Here, the opening rate of the expansion valve 342 is controlled by the controller 117 or 217.

The operation of the heat pump device 300 during a cooling operation will now be explained. During the cooling operation, the four-way valve 339 is set so that refrigerant can flow in the direction indicated by the dashed lines. Note that the cooling operation refers to not only cooling used in air conditioning but also cold-water supply in which cold water is generated by removing heat from water, or freezing.

A gas-phase refrigerant that has entered a high-temperature, high-pressure state (point 1 in FIG. 34) at the compressor 331 is discharged from the compressor 331. The refrigerant is then subjected to heat exchange and liquified (point 2 in FIG. 34) at the heat exchanger 337 functioning as a condenser and a heat-radiator. The liquid-phase refrigerant liquefied at the heat exchanger 337 is depressurized into a gas-liquid two-phase state (point 3 in FIG. 34) at the expansion valve 336. The refrigerant that has entered a gas-liquid two-phase state at the expansion valve 336 is subjected to heat exchange, cooled, and liquified (point 4 in FIG. 34) at the internal heat exchanger 335. At the internal heat exchanger 335, the refrigerant that has entered a gas-liquid two-phase state at the expansion valve 336 exchanges heat with the refrigerant that is in a gas-liquid two-phase state (point 9 in FIG. 34) by depressurizing, at the expansion valve 342, the refrigerant liquified into a liquid-phase state at the internal heat exchanger 335. The liquid-phase refrigerant that has been subjected to heat exchange (point 4 in FIG. 34) at the internal heat exchanger 335 branches and flows into the main refrigerant circuit 338 and the injection circuit 341.

The liquid-phase refrigerant flowing through the main refrigerant circuit 338 exchanges heat, at the receiver 334, with the refrigerant sucked into the compressor 331 and is further cooled (point 5 in FIG. 34). The liquid-phase refrigerant cooled at the receiver 334 is depressurized into a gas-liquid two-phase state (point 6 in FIG. 34) at the expansion valve 333. The refrigerant that has entered a gas-liquid two-phase state at the expansion valve 333 is subjected to heat exchange and heated (point 7 in FIG. 34) at the heat exchanger 332 functioning as an evaporator. At this time, the refrigerant absorbs heat and thereby cools the water circulating through the water circuit 343. The cooled water is used for cooling or freezing. In this way, the heat pump device 300 constitutes a heat pump system together with a fluid utilization device that uses water (fluid) circulating the water circuit 343. The heat pump system is useable as an air conditioner, a heat-pump water heater, a refrigerator, a freezer, or the like.

The refrigerant heated at the heat exchanger 332 is further heated (point 8 in FIG. 34) at the receiver 334 and is sucked into the compressor 331.

On the other hand, the refrigerant flowing through the injection circuit 341 is depressurized (point 9 in FIG. 34) at the expansion valve 342, as explained above, and is subjected to heat exchange (point 10 in FIG. 34) at the internal heat exchanger 335. The refrigerant (injection refrigerant) that has entered a gas-liquid two-phase state after being subjected to heat exchange at the internal heat exchanger 335 maintains the gas-liquid two-phase state and flows into the compressor 331 from the injection pipe of the compressor 331. The compression operation in the compressor 331 is the same as that of the heating operation.

Note that, when the injection operation is not to be performed, the opening rate of the expansion valve 342 is fully closed, as in the heating operation, so that the refrigerant does not flow into the injection pipe of the compressor 331.

In the description above, the heat exchanger 332 is such a heat exchanger as a plate-type heat exchanger that exchanges heat between the refrigerant and water circulating through the water circuit 343. However, the heat exchanger 332 is not limited to this. Alternatively, the heat exchanger 332 may exchange heat between the refrigerant and air. Moreover, the water circuit 343 may be any circuit other than a circuit through which water circulates, for example, a circuit through which a fluid besides water circulates.

As described above, the heat pump device 300 can be used as a heat pump device 300 using an inverter compressor, such as an air conditioner, a heat-pump water heater, a refrigerator, or a freezer.

As described above, the heat pump device 300 is useable as an air conditioner, a heat-pump water heater, a refrigerator, a freezer, or the like. In particular, the heat pump device 300 is suitable for a heat pump device that executes heating in a compressor by using high-frequency energization.

What is claimed is:

1. A refrigerating cycle device comprising:
    a compressor to compress a refrigerant;
    a motor to generate power for compressing the refrigerant by rotating a rotor with voltage applied to a plurality of wirings, the motor being disposed in the compressor; and
    a wiring switch part to switch between a plurality of wiring states by changing connection between the plurality of wirings;
    the wiring switch part is configured to, responsive to a rotational speed of the rotor exceeding a predetermined value, raise a temperature of the refrigerant in the compressor by switching to a first wiring state of the plurality of wiring states, the first wiring state differing from a second wiring state of the plurality of wiring states, efficiency of the second wiring state being highest at a rotational speed which exceeds the predetermined value.

2. The refrigerating cycle device according to claim 1, wherein the predetermined value represents a rotational speed of the refrigerating cycle device during a rated operation.

3. The refrigerating cycle device according to claim 1, wherein the predetermined value represents a rotational speed higher than a rotation speed at a time when a temperature difference between a set temperature and a temperature detected from a substance is a predetermined temperature difference, the set temperature being a target temperature for the substance, wherein the substance is to be heated by the refrigerating cycle device.

4. The refrigerating cycle device according to claim 3, wherein the predetermined temperature difference is a temperature difference at a time when switching between a wiring state having a smallest electromotive force of the plurality of wiring states and another wiring state having a second smallest electromotive force of the plurality of wiring states is to be performed.

5. The refrigerating cycle device according to claim 1, further comprising an inverter to output three-phase AC current to the motor,
    wherein the inverter shifts a phase of the three-phase AC current to vary a rotational speed at which the efficiency is highest in each of the plurality of wiring states.

6. The refrigerating cycle device according to claim 1, further comprising a discharge temperature detector to detect a discharge temperature, the discharge temperature being a temperature of the refrigerant discharged from the compressor,
    wherein when the discharge temperature exceeds a predetermined threshold temperature, the wiring switch part switches a wiring state being used to a wiring state having an electromotive force smaller than the electromotive force of the wiring state being used.

7. The refrigerating cycle device according to claim 2, wherein,
    the plurality of wiring states are a delta connection and a star connection,
    the first wiring state is a star connection, and
    the second wiring state is a delta connection.

8. The refrigerating cycle device according to claim 2, wherein,
    the plurality of wiring states are a series star connection, a series delta connection, a parallel star connection, and a parallel delta connection, the series star connection being a connection in which two or more wirings of the plurality of wirings are connected in series in one phase, the series delta connection being a connection in which two or more wirings of the plurality of wirings are connected in series in one phase, a parallel star connection being a connection in which two or more wirings of the plurality of wirings are connected in parallel in one phase, a parallel delta connection being a connection in which two or more wirings of the plurality of wirings are connected in parallel in one phase,
    the first wiring state is the series star connection, the series delta connection, or the parallel star connection, and
    the second wiring state is the parallel delta connection.

9. The refrigerating cycle device according to claim 2, further comprising an inverter to output three-phase AC current to the motor, wherein the inverter shifts a phase of the three-phase AC current to vary a rotational speed at which the efficiency is highest in each of the plurality of wiring states.

10. The refrigerating cycle device according to claim 3, further comprising an inverter to output three-phase AC current to the motor,
wherein the inverter shifts a phase of the three-phase AC current to vary a rotational speed at which the efficiency is highest in each of the plurality of wiring states.

11. The refrigerating cycle device according to claim 4, further comprising an inverter to output three-phase AC current to the motor,
wherein the inverter shifts a phase of the three-phase AC current to vary a rotational speed at which the efficiency is highest in each of the plurality of wiring states.

12. The refrigerating cycle device according to claim 2, further comprising a discharge temperature detector to detect a discharge temperature, the discharge temperature being a temperature of the refrigerant discharged from the compressor,
wherein when the discharge temperature exceeds a predetermined threshold temperature, the wiring switch part switches a wiring state being used to a wiring state having an electromotive force smaller than the electromotive force of the wiring state being used.

13. The refrigerating cycle device according to claim 3, further comprising a discharge temperature detector to detect a discharge temperature, the discharge temperature being a temperature of the refrigerant discharged from the compressor,
wherein when the discharge temperature exceeds a predetermined threshold temperature, the wiring switch part switches a wiring state being used to a wiring state having an electromotive force smaller than the electromotive force of the wiring state being used.

14. The refrigerating cycle device according to claim 4, further comprising a discharge temperature detector to detect a discharge temperature, the discharge temperature being a temperature of the refrigerant discharged from the compressor,
wherein when the discharge temperature exceeds a predetermined threshold temperature, the wiring switch part switches a wiring state being used to a wiring state having an electromotive force smaller than the electromotive force of the wiring state being used.

15. The refrigerating cycle device according to claim 5, further comprising a discharge temperature detector to detect a discharge temperature, the discharge temperature being a temperature of the refrigerant discharged from the compressor,
wherein when the discharge temperature exceeds a predetermined threshold temperature, the wiring switch part switches a wiring state being used to a wiring state having an electromotive force smaller than the electromotive force of the wiring state being used.

16. The refrigerating cycle device according to claim 4, wherein,
the plurality of wiring states are a delta connection and a star connection,
the first wiring state is a star connection, and
the second wiring state is a delta connection.

17. The refrigerating cycle device according to claim 4, wherein,
the plurality of wiring states are a series star connection, a series delta connection, a parallel star connection, and a parallel delta connection, the series star connection being a connection in which two or more wirings of the plurality of wirings are connected in series in one phase, the series delta connection being a connection in which two or more wirings of the plurality of wirings are connected in series in one phase, a parallel star connection being a connection in which two or more wirings of the plurality of wirings are connected in parallel in one phase, a parallel delta connection being a connection in which two or more wirings of the plurality of wirings are connected in parallel in one phase,
the first wiring state is the series star connection, the series delta connection, or the parallel star connection, and
the second wiring state is the parallel delta connection.

* * * * *